(12) United States Patent
Peshkin

(10) Patent No.: US 7,047,826 B2
(45) Date of Patent: May 23, 2006

(54) FORCE SENSORS

(75) Inventor: Michael A. Peshkin, Evanston, IL (US)

(73) Assignee: Northwestern University, Evanston, IL (US)

( * ) Notice: Subject to any disclaimer, the term of this patent is extended or adjusted under 35 U.S.C. 154(b) by 77 days.

(21) Appl. No.: 10/896,348

(22) Filed: Jul. 20, 2004

(65) Prior Publication Data
US 2004/0261544 A1 Dec. 30, 2004

Related U.S. Application Data

(63) Continuation-in-part of application No. 09/307,357, filed on May 7, 1999, now abandoned.

(51) Int. Cl.
G01D 1/00 (2006.01)

(52) U.S. Cl. .................................................. 73/862.53
(58) Field of Classification Search ............... 73/862.53, 73/862.54; 33/556
See application file for complete search history.

(56) References Cited

U.S. PATENT DOCUMENTS

| 3,848,463 A | * | 11/1974 | Hejzlar et al. ........... 73/862.53 |
| 4,005,396 A | | 1/1977 | Fujiwara et al. |
| 4,028,812 A | * | 6/1977 | Fieberg ....................... 33/556 |
| 5,088,333 A | * | 2/1992 | Kiely et al. ............... 73/862.53 |
| 5,815,091 A | | 9/1998 | Dames et al. |
| 5,831,596 A | | 11/1998 | Marshall et al. |
| 6,248,018 B1 | | 6/2001 | Kehlstadt et al. |
| 6,447,448 B1 | | 9/2002 | Ishikawa et al. |
| 6,486,872 B1 | | 11/2002 | Rosenberg et al. |

FOREIGN PATENT DOCUMENTS

WO    WO 00/38570    7/2000

* cited by examiner

Primary Examiner—Edward Lefkowitz
Assistant Examiner—Jewel V. Thompson
(74) Attorney, Agent, or Firm—McAndrews, Held & Malloy, Ltd.

(57) ABSTRACT

A force sensor for measuring force and/or torque about a single axis or multiple axes is rugged, inexpensive and can be fabricated over a wide range of sizes. The force sensor includes first and second members that are coupled to each other by an elastomeric flexure that allows at least one member to be movable with respect to the other member when a force is applied. The force sensor includes a transmitting coil or printed circuit trace and a receiving coil or printed circuit trace. In one embodiment, the transmitting and receiving coils are formed on different ones of the first and second members. In another embodiment, the transmitting and receiving coils are formed on the same member and the other member is formed as a shading plate. A signal applied to the transmitting coil induces a signal in the receiving coil that represents the force applied.

61 Claims, 15 Drawing Sheets

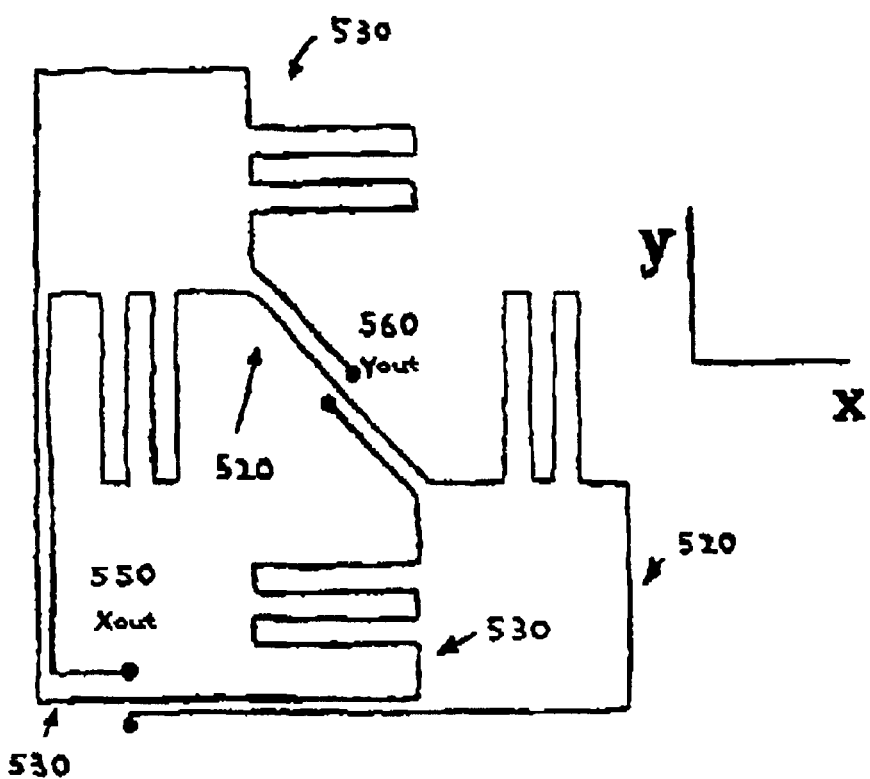
FIG. 7
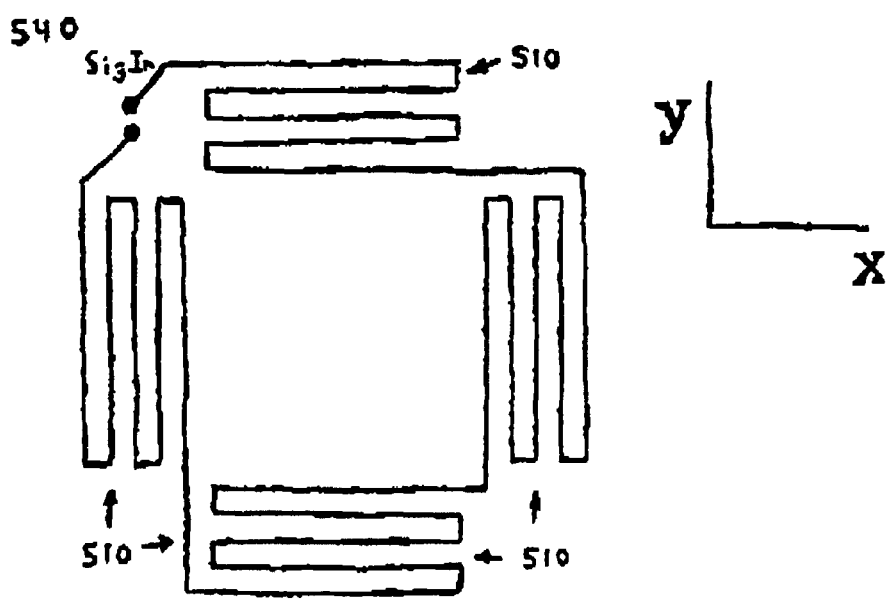

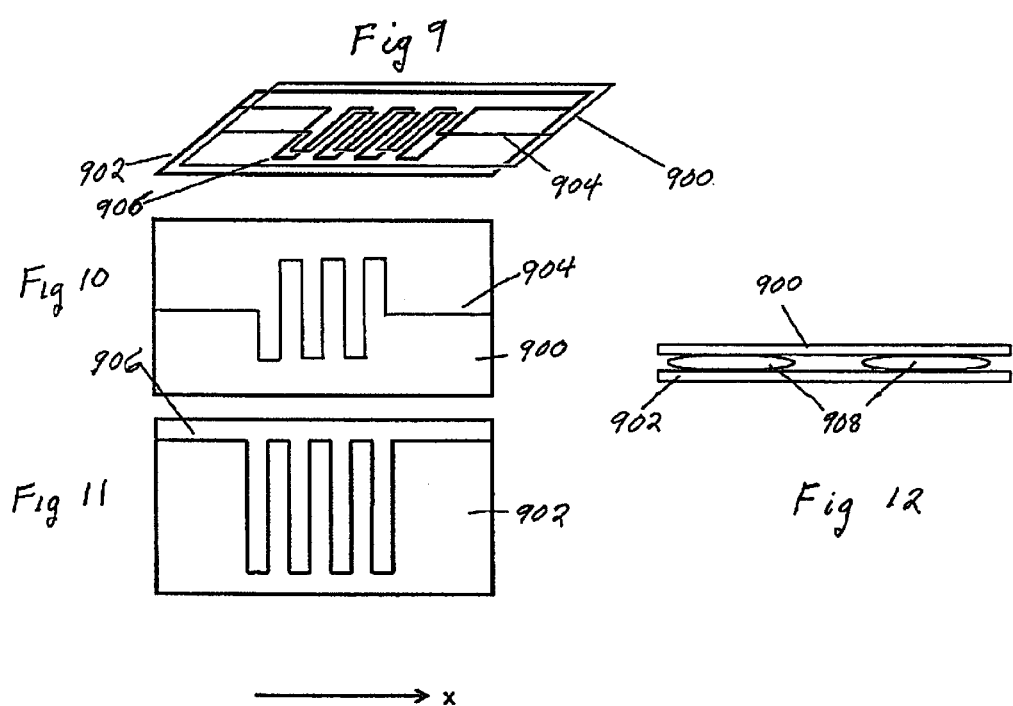

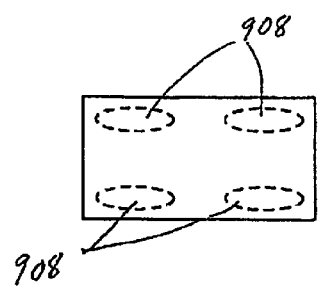
Fig 13
Fig 14
Fig 15
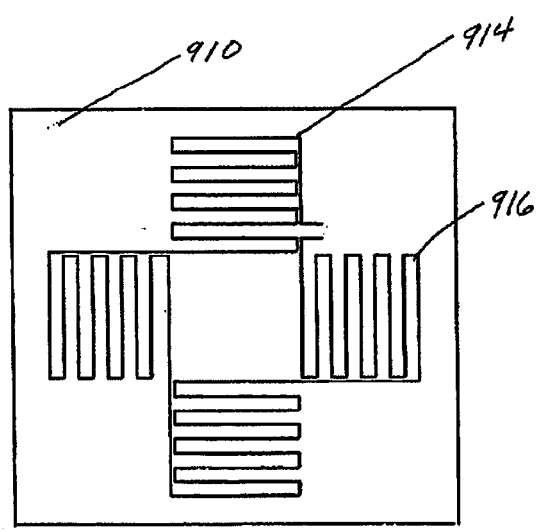
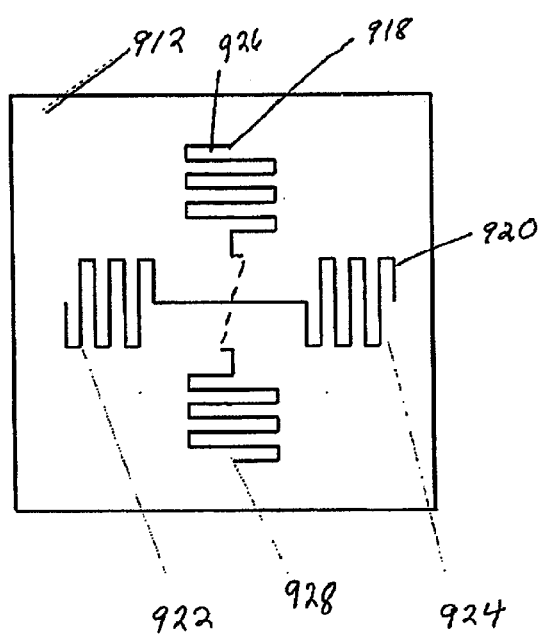
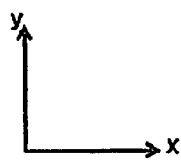

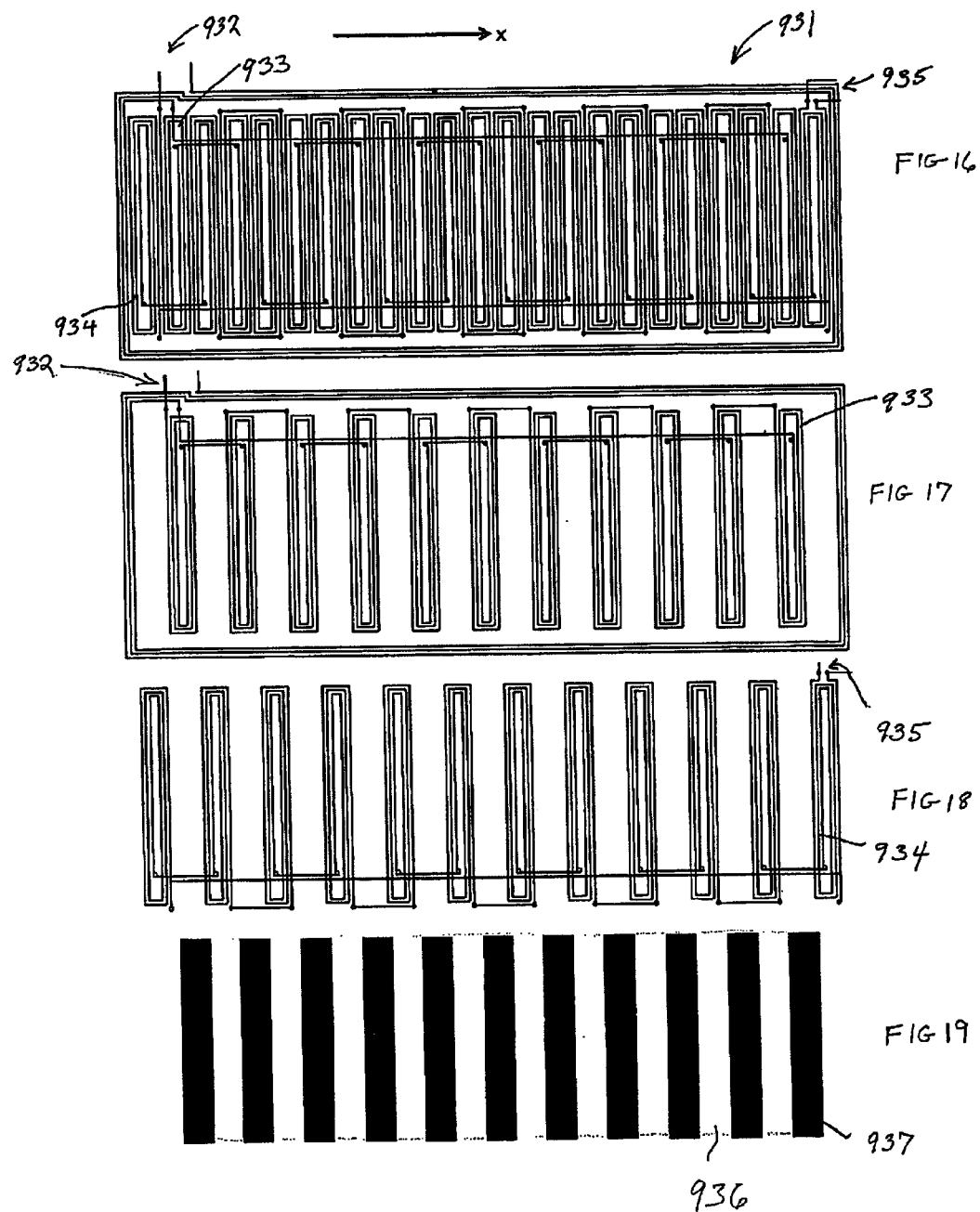

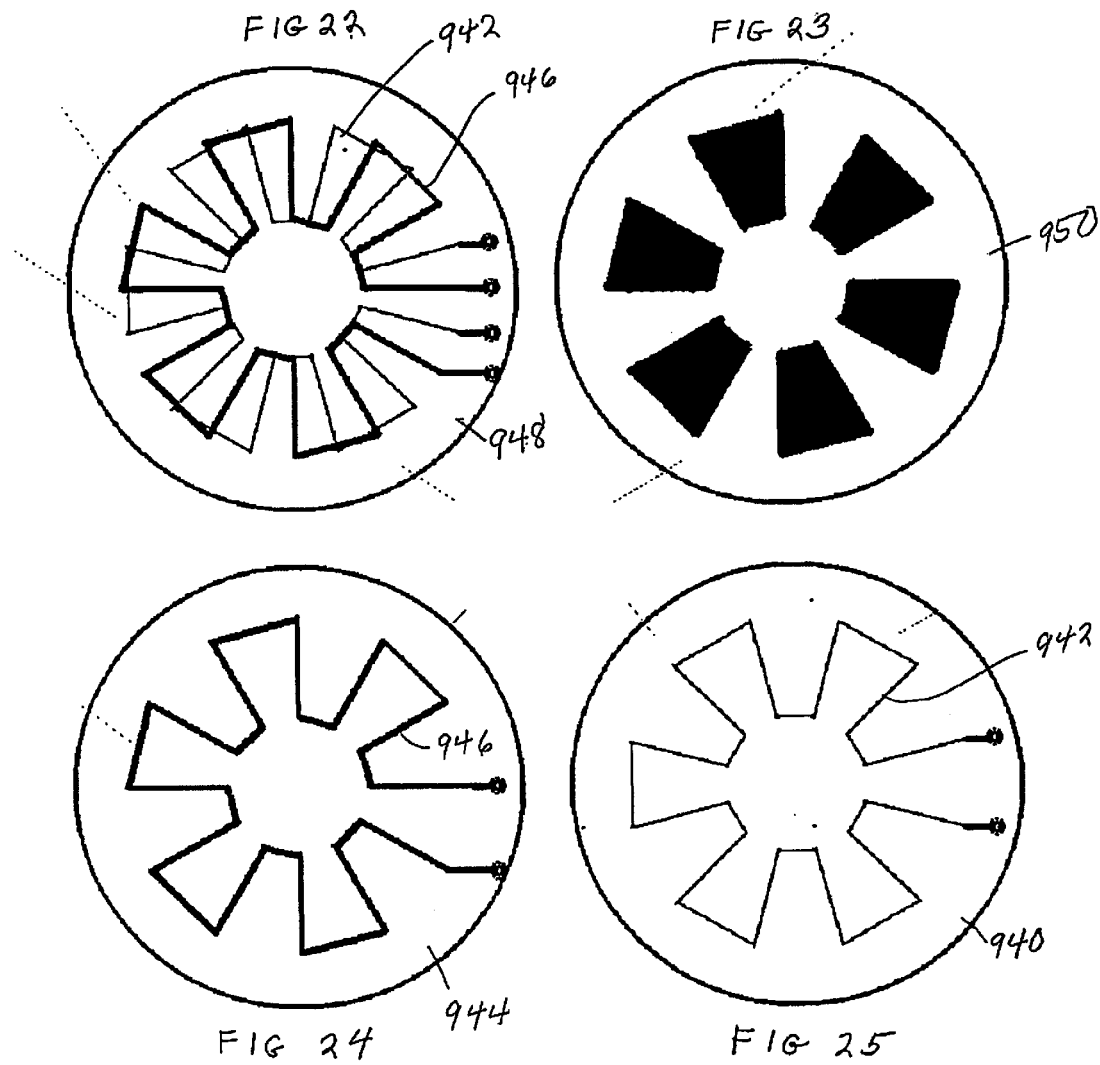

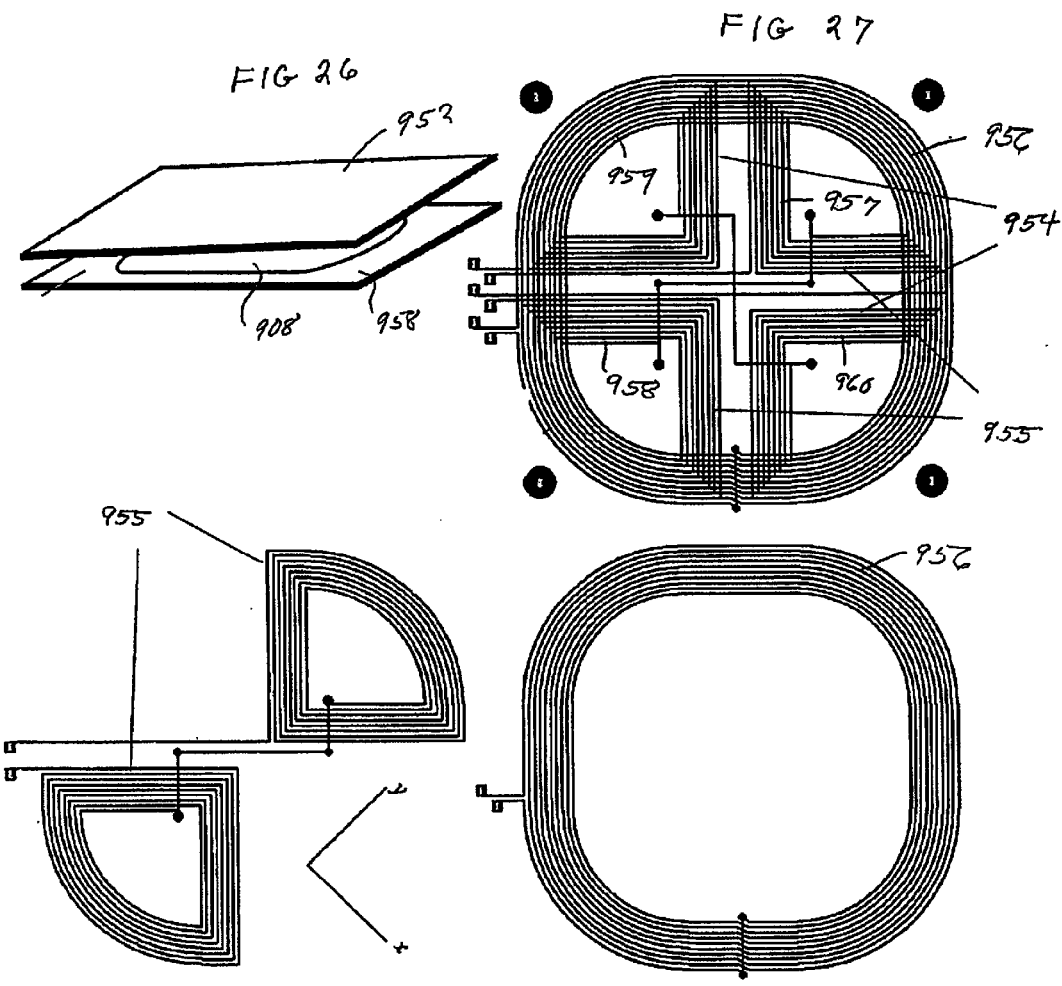

FORCE SENSORS

CROSS-REFERENCE TO RELATED APPLICATIONS

This application is a continuation-in-part of U.S. patent application Ser. No. 09/307,357 filed May 7, 1999 now abandoned.

STATEMENT REGARDING FEDERALLY SPONSORED RESEARCH OR DEVELOPMENT

This invention was made with the support of the National Science Foundation (NSF), a Federal Government Agency.

TECHNICAL FIELD

The present invention is directed to a force sensor for measuring force and torque for use in industrial, consumer and medical applications and more particularly to a force sensor and more particular to such a force sensor that is extremely rugged and easy to manufacture.

BACKGROUND OF THE INVENTION

Force sensors are typically used in industrial applications to measure applied forces. Force sensors that are suitable for industrial applications such as in robot end-effectors or machining stations are typically based on strain gauges and may be very expensive. While the strain gauge elements themselves may not be expensive, the difficulty of applying and calibrating strain gauges in force sensor applications results in costly devices. These types of force sensors based on conventional strain gauges designed for use in industrial applications, however, are overdesigned for use in measuring human inputs and may be unnecessarily costly. As such, the requirements for these conventional force sensors are unnecessarily stringent for devices used in other applications, such as for interactive human use.

In addition, industrial force sensors are also very rugged and stiff such that applying a force to them causes little or no perceptible deflection. In the case of a conventional strain-gauge sensor, the force to be measured is applied to a very stiff flexure element that causes only an extremely tiny deflection. The flexure may be a rigid beam and to the human eye it may not appear to deflect at all. The strain gauge bonded to the flexure, however, is incredibly sensitive to tiny changes in its length, and although the flexure beam does not bend visibly, the strain gauge nevertheless tells how much deflection has occurred. The amount of deflection is proportional to the force is being applied.

Many different types of industrial machinery and robotic devices are interactively controlled by a human operator. Typically, the human operator manually manipulates a set of controls that indicate to the machine or robotic device the movements desired by the operator. By sensing the operator's manipulation of the controls, the machine determines the operator's intent in moving the device and can implement the desired action.

In general consumer applications such with the computer video games, a handheld joystick is commonly utilized as a user input control device. A joystick typically measures the changes in position of the joystick handle and translates the positional information into a data signal format that can be transmitted to the digital computer. A typical joystick, however, is not rugged or reliable enough to be utilized in an industrial application where the device may become damaged through constant handling and use. The reliability of the control device is also an important factor in an industrial application where a failure of the joystick may result in the loss of control of machinery that may cause an accident and injure nearby personnel or workers. Needed are control devices and force sensors that are rugged enough for industrial applications, yet are not prohibitively expensive.

BRIEF SUMMARY OF THE INVENTION

In accordance with the present invention, the disadvantages of prior force sensors for measuring force and/or torque have been overcome. The force sensor of the present invention is capable of measuring force and torque with respect to a single axis or multiple axes. The force sensor utilizes a flexure element having low stiffness and displacement measuring elements that are sensitive to relatively large displacements. The multi-axis force sensor of the present invention is adaptable to fabrication or manufacture over a wide range of sizes, from the scale of microelectromechanical systems (MEMS) to the scale of a human hand or even larger.

More particularly, the force sensor of the present invention includes a first member and a second member with a flexure coupled therebetween wherein at least one of the first and second members is movable with respect to the other member by a force applied thereto. A first coil is support on either the first or the second member and a second coil is supported on either the first or the second member. A signal is applied to the first coil, inducing a signal in the second coil representing the applied force.

In accordance with one embodiment of the present invention, movement of one member with respect to the other member produces a proportional change in the amplitude and phase of the signal induced in the second coil wherein the proportional change may be linear or non-linear.

In one embodiment of the present invention, the flexure is an elastomeric flexure. However, other types of flexures such as those that include a plurality of springs, or a plurality of beams or a plurality of flexible strips, etc. can also be used.

In another embodiment of the present invention, the first coil is a transmitting coil and the second coil is a receiving coil. The first member is movable by an applied force and the second member is a stationary member. The transmitting coil and the receiving coil may be supported on different ones of the stationary and movable members. For example, the transmitting coil may be supported on the movable member and the receiving coil may be supported on the stationary member. Alternatively, the transmitting coil may be supported on the stationary member and the receiving coil may be supported on the movable member.

In still a further embodiment of the present invention the transmitting and receiving coils are supported on the same member and the other member includes a shading plate.

In one embodiment of the present invention, the first and second coils are printed circuit traces. Various patterns for the printed circuit traces may be utilized. For example, in one embodiment, the traces are formed in a first zigzag pattern for measuring translation along one axis. In another embodiment, the force sensor includes traces in a second zigzag pattern orthogonal to the first pattern for measuring translation along two orthogonal axes. In still another embodiment, the traces form a first loop pair having one loop and another, counter-rotated loop measuring tilt about a first axis. In a further embodiment, a second loop pair of traces is included in the force sensor wherein the second loop pair of traces is orthogonal to the first loop pair, the second loop pair having one loop and another counter-rotated loop for measuring tilt about a second axis orthogonal to the first axis. In still another embodiment of the present invention, the traces are in a circular zigzag pattern for measuring rotation. In a further embodiment, the traces are a loop pair measuring distance between the first and second members. A third loop trace may be included to null the mutual inductance when the first and second members are at a predetermined distance from each other.

In the embodiment including a shading plate and in which the first and second coils are supported on the same member and formed as printed circuit traces, various trace patterns can also be used. For example, the traces may be formed in a zigzag pattern where the shading plate is patterned having the same periodicity to measure translation along a first axis. A second set of traces and shading plate may also be provided wherein the second set is orthogonal to the first set but has the same pattern as used for the traces and shading plate of the first set so as to measure translation along an axis orthogonal to the first axis. In another embodiment of the present invention wherein the first and second coils are formed on the same member, the coil traces may form a first loop pair with one loop and another loop counter-rotated so as to measure tilt about a first axis. A second orthogonal loop pair of traces may also be added to the force sensor having a first loop pair formed on one member so as to measure tilt about two orthogonal axes. Further, the receiving and transmitting traces may have a circular zigzag pattern for measuring rotation wherein these traces are formed on one member.

These and other advantages and novel features of the present invention, as well as details of an illustrated embodiment thereof, will be more fully understood from the following description and drawings.

BRIEF DESCRIPTION OF THE SEVERAL VIEWS OF THE DRAWING

FIG. 7 is a diagram illustrating an inductive displacement measuring device that can be utilized with the embodiments of the invention;

FIG. 9 is a perspective view of a single axis translational force sensor of one embodiment of the present invention;

FIG. 10 is a bottom view of a first printed circuit board member having a first coil in the form of a circuit trace of the force sensor of FIG. 9;

FIG. 11 is a top view of a printed circuit board member as shown in FIG. 9 and having a coil in the form of a circuit trace;

FIG. 12 is a side view of the force sensor illustrated in FIG. 9;

FIG. 13 is a top view of the force sensor of FIG. 9 illustrating the placement of the flexure of the sensor where the flexure is formed of a number of elastomeric flexure elements;

FIG. 14 is a bottom view of a first member having a trace pattern for a two axes translational force sensor;

FIG. 15 is a top view of a second member having a trace pattern for use with the first member shown in FIG. 14 to provide a two axes translational force sensor;

FIG. 16 illustrates the relative placement of transmitting and receiving traces for a single axis translational force sensor wherein the transmitting and receiving traces are located on the same printed circuit board member;

FIG. 17 illustrates the transmitting trace pattern of the force sensor of FIG. 16;

FIG. 18 illustrates the receiving trace pattern of the force sensor of FIG. 16;

FIG. 19 illustrates the pattern of the shading plate for the force sensor of FIG. 16;

FIG. 22 illustrates receiving and transmitting traces combined on a single printed circuit board, the traces being formed in a circular zigzag pattern for a force sensor utilizing a shading plate;

FIG. 23 is a top view illustrating a shading plate for use with the force sensor depicted in FIG. 22;

FIG. 24 illustrates a circular zigzag pattern for receiving traces carried on one member of a force sensor;

FIG. 25 illustrates the transmitting trace formed in a circular zigzag pattern on a second member of the force sensor having the first member depicted in FIG. 24;

FIG. 26 illustrates a perspective view of a force sensor in accordance with another embodiment of the present invention having one elastomeric flexure element;

FIG. 27 illustrates the trace pattern for a force sensor having a transmitting trace and two pairs of receiving traces for measuring torque about two axes;

FIG. 28 illustrates a receiving trace pattern for one of the receiving trace pairs of FIG. 27;

FIG. 29 illustrates the transmitting trace of the force sensor trace pattern of FIG. 27;

DETAILED DESCRIPTION OF THE INVENTION

Figure 1:
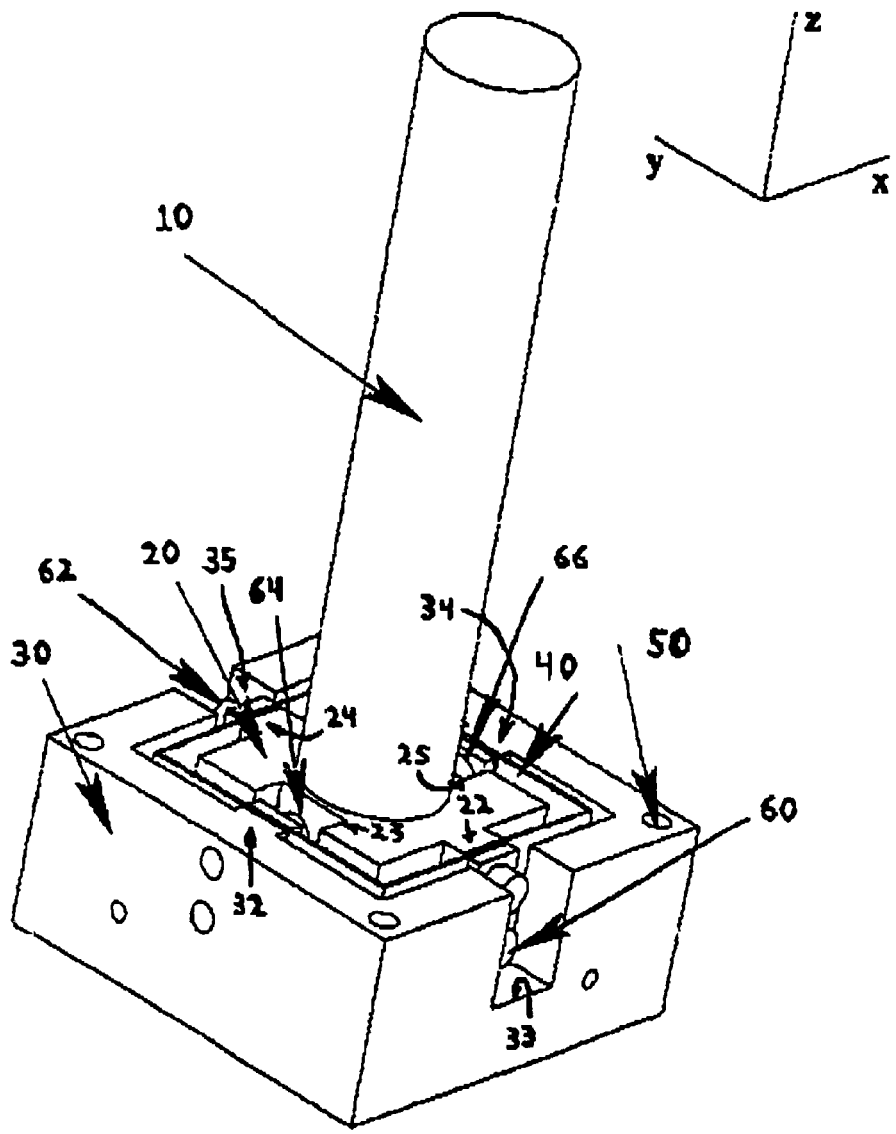
FIG. 1 show a perspective view of an illustrative multi-axis force sensor utilizing a flexure.

One embodiment of a force sensor of the present invention as shown in FIG. 1 is used to measure forces applied along different directional axes. This embodiment is particularly designed to accommodate manual control input from a human operator.

Generally, a force to be measured has components along three axes, the x, y and z axes. In addition, the force to be measured may be a torque or movement about the x, y or z axis. A force sensor may measure these six components of force/torque or a subset thereof. It is noted that as used herein, the term force includes torque about one or more axes as well as force components along one or more axes.

An embodiment of a two-axis force sensor as shown in FIG. 1 includes a first member 20, and second member 30, and a flexure 40 positioned between the first member 20 and the second member 30. For purposes of the following embodiments, the first member 20 is preferably an inner member 20 while the second member 30 is preferably an outer member 30. This embodiment and other embodiments are for illustrative purposes and the invention is not limited as to which of the first or second member is an inner or outer member or a movable or stationary member. Moreover, the first and second members may be arranged in other configurations. For example, the first member could be positioned below, above, within, outside, nearby, or adjacent to the second member, although for purposes of the embodiment illustrated in FIG. 1, the first, inner member 20 is positioned within the second, outer member 30.

Applying a force to the handle 10 connected to the inner member 20 moves the inner member 20 relative to the outer member 30 as controlled by the flexure 40 of FIG. 1. In one particular embodiment, the inner and outer members 20, 30 are configured to allow a limited displacement between the inner and outer members 20, 30 along the x axis and the y axis directions. The amount or degree of displacement or movement of the inner member 20 relative to the outer member 30 along an axis is a function of the applied force as will be described in more detail below.

The movement of the inner member 20 relative to the outer member 30 is constrained by the physical compliance of the flexure 40 and ultimately the mechanical clearance between the inner member 20 and the outer member 30. In an embodiment, this distance may be on the order of one millimeter (1 mm) or several millimeters. Of course the invention is not limited to this displacement and the distance between the inner member 20 and the outer member 30 may vary, for instance, according to the particular application and to the dimensions of the members in a particular design.

One embodiment of the force sensor is designed to be particularly suited to measuring forces manually imparted by a human operator to the handle 10. It should be understood, however, that the present invention can also be used in a variety of different configurations or with other mechanical assemblies to measure applied forces. In this embodiment suitable for manual use by a human operator, forces are applied to the graspable handle 10. Although the handle 10 in this embodiment is shown to be a cylindrical member, the handle 10 can be any graspable interface capable of accepting movement from a user or a user's hand. Preferably, the handle 10 is formed of a durable metal, wood, graphite composite, etc. and may be covered with an appropriate rubber grip to avoid slippage.

In this embodiment, the handle 10 is shown as mounted onto the inner member 20. It should be understood that the handle 10 may be connected to either the first (here inner) member 20 or second (here outer) member 30 as will be apparent to those skilled in the art. The graspable handle 10 can be a separate component fixably mounted to the inner member 20 through a variety of means including rivets, joints, fasteners, screws, bolts or adhesives as well known to those skilled in the art. The handle 10 can also be integrally formed with the inner member 20. The handle 10 can also be attached to the outer member 30 in other embodiments (not shown in FIG. 1) to move the outer member with respect to the inner member 20.

In this embodiment, the inner member 20 is suspended within an outer member 30 by a flexure element 40. The flexure element 40 is flexible enough to allow a relative displacement to occur (when a force is applied to the handle 10) between the inner member 20 to which the handle 10 is mounted and an outer member 30. The inner member 20 can move as guided by the handle 10 with respect to the outer member 30 within the mechanical constraint allowed by the flexure 40 and the physical clearance between the inner and outer members 30. In a particular embodiment, the handle 10 may be allowed to move less than one millimeter (1 mm). In this embodiment, handle 10 provides a movable yet durable and not overly stiff control interface for a human user.

More generally, the graspable handle 10 can be attached, mounted or connected to either the first (here inner) member 20 or the second (here outer) member 30 so the flexure 40 that supports the members 20, 30 can be directed via handle 10 to allow one member to move relative to another member along two axes.

It should be understood that FIG. 1 is just one embodiment of a two axes force sensor. A myriad of possibilities of arrangements of the first member, second member, the handle, and the flexure exist and will be apparent to those skilled in the art. Varieties of positioning or different attachment strategies are envisioned, including with respect to the interaction between the first and second member and the direction of one or both by the handle.

Preferably, the outer member 30 of FIG. 1 may also serve as a mounting, base or housing for the force sensor. A plurality of mounting holes 50 is provided for the outer member 30 to connect or mount the force sensor to other equipment or devices. Of course, the force sensor of FIG. 1 can be implemented as a stand-alone device without a plurality of mounting holes 50.

In the embodiment shown in FIG. 1, the flexure 40 is mounted to the outer member 30 and inner member 20 by fasteners 60, 62, 64, 66. For example, the flexure 40 is fastened to the outer member 30 via fasteners 60, 62. The fasteners 60, 62 connect the flexure 40 to the outer member 30 and fasteners 64, 66 connect the flexure 40 to the inner member 20. In this manner, the flexure 40 suspends the inner member 20 within the outer member 30 and allows movement of the inner member 20 within the outer member 30. The fasteners 60, 62, 64, 66 may be implemented in a variety of was such pairs of rivets, screws, bolts, adhesives, welds, etc. Additionally inner member 20, flexure 40, and outer member 30 may be fabricated as a single unit by molding, machining, casting, forging, etc., thus avoiding the need for fasteners.

As shown in FIG. 1, the inner member 20 and the outer member 30 include raised sections 22, 24, 32, 34 that are formed as raised or standoff sections to receive the fasteners 60, 62, 64, 66 that secure the flexure 40 in place between the inner and outer members. The sections 22, 24, 32, 34 are preferably formed as raised standoff sections to create clearance between the inner 20 and outer member 30 to allow for movement and deflection of the inner member 20 relative to the outer member 30. The height of the raised standoff sections 22, 24, 32, 34 and the clearance provided between the inner 20 and outer member 30 depends on the desired amount of displacement of the handle 10 and the inner member 20 as can be determined by those skilled in the art. In a particular embodiment, the height of the raised standoff is approximately equal to the displacement desired by the inner member 20.

Preferably, the inner and outer members 20, 30 are also formed with corresponding relieved recesses, channels, or slots 23, 25, 33, 35 opposite the standoff sections 22, 24, 32, 34. The relieved sections 22, 24, 32, 34 provide additional clearance for the raised standoff sections 22, 24, 32, 34 to allow movement of the inner member 20 with respect to the outer members 30. For example, when the handle 10 and inner member 20 are moved along the x axis direction, the standoff sections 32, 34 formed in the outer member 30 may be displaced into the recessed channels 23 or 25 formed in the inner member 20. Similarly, the outer member 30 also includes slots or channels 33, 35 which receive the raised sections 22, 24 of the inner member 20 during displacement of the inner member 20 relative to the outer member 30 in the y axis direction. By appropriately providing such raised and relieved sections, clearance for displacement of the movement of the inner 20 and outer members 30 can be created.

In this embodiment of the invention, the flexure element 40 that supports the inner member 20 within the outer member 30 is preferably made of a deformable material that is formed to dimensions capable of allowing the flexure 40 to provide a desired mechanical deflection. The mechanical deflection of the flexure 40 preferably allows the inner member 20 to move relative to the outer member 30 along the two axes, x and y in FIG. 1. In one embodiment, the flexure 40 is designed so that it does not bend significantly in response to applied forces in the z-direction or to torques about the x and y axes. The particular choice of materials for the flexure and the dimensional characteristics of the flexure in this embodiment will be described in more detail with respect to FIGS. 2 and 3.

In the two-axis sensor shown in FIG. 1, the applied force imparted to the handle 10 may be determined from the displacement or deflection of the inner member 20 relative to the outer member 30 via a readout mechanism or technique to yield a two-axis force sensor. For example, the force sensor may include a readout mechanism to measure the displacement of the inner member 20 in the direction along each axis. The different force measurements along each axis are independent of each other and each readout mechanism or technique outputs a deflection value unique for each axis. Exemplary readout mechanisms are described in more detail with reference to FIGS. 5–7.

In a further embodiment described in more detail later, one or more printed circuit boards ("PCBs") (not shown in FIG. 1) are also positioned on or adjacent to the inner member 20 to detect the relative displacement of the inner member 20 with respect to the outer member 30. Preferably, the PCB includes an electronic sensor circuit to detect the relative motion of the inner and outer member 20, 30. The sensor circuit can be used to measure the displacement, as allowed by the flexure 40, of the inner member 20 relative to the outer member 30 in response to an applied force at the handle 10, as will be further described herein.

Figure 2:
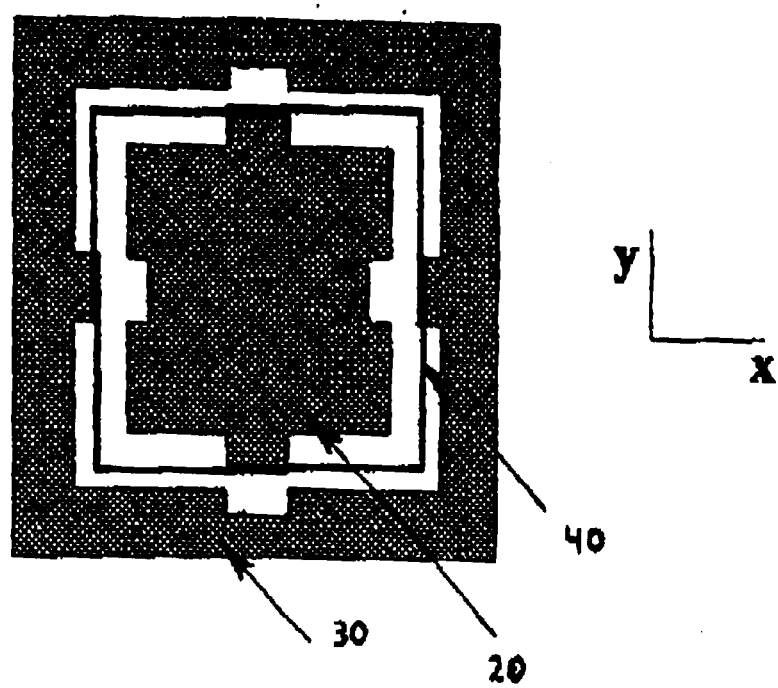
FIG. 2 shows a top internal view of a multi-axis force sensor showing the flexure utilized in the force sensor of FIG. 1.

FIG. 2 is a top internal or cross-sectional view of a multi-axis force sensor of a roughly similar construction to that of FIG. 1. The flexure 40 supports and suspends the inner member 20 from the outer member 30 and is positioned therebetween. In one embodiment, the flexure 40 is designed to allow in the range of one millimeter of displacement along each axis or motion between the inner member 20 and the outer member 30. To limit the travel of the inner member at this desired amount of deflection, the inner member 20 and the outer member 30 may be designed to physically make contact with each other at this displacement, thus preventing any further relative motion between the members. The desired physical clearance can be obtained by choosing the dimensions of the raised standoff sections previously described above to create the desired clearance between the inner and outer members 20, 30. In addition, the flexure 40 is constrained from deflecting beyond this point as well, and thus the flexure 40 is protected from excessively large deflections or stretching that might cause breakage of or fissure in the flexure 40. Alternatively, the flexure 40 may be chosen to have a compliance such that it limits the travel of the inner member 20 before the inner member 20 is physically prevented from further movement by the outer member 30. The flexure 40 may be chosen of a material or dimension to allow only a limited travel of the inner member 20 as described in more detail below.

Figure 3:
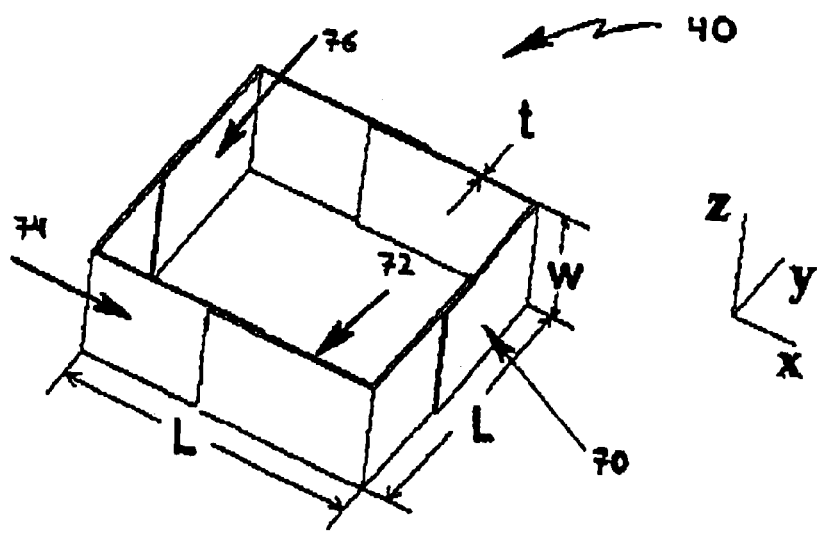
FIG. 3 is a perspective view of the flexure detailing particular aspects of the flexure elements making up the flexure of FIG. 2.

FIG. 3 is a perspective view showing a particular construction of flexure 40 including its particular dimensional properties. In one embodiment of the flexure 40, the flexure 40 is formed of four rectangular-shaped strips of material 70, 72, 74, 78. The flexure 40 is shown to have dimensions of length L, height or depth w, and thickness t. In this embodiment, each of the strips of material 70, 72, 74, 78 forming the flexure 40 are forced into "L"-shaped strips of material with a right-angle bend at about half the length of each strip. As will be apparent to those skilled in the art, each of the strips of material 70, 72, 74, 78 forming the flexure 40 are of a length greater than L, or have a length L+O (L plus Overlap).

As shown in FIGS. 1 and 3, the intersection of each of the strip sections 70, 72, 74, 78 overlap one another and are fastened to the respective inner and outer members 20, 30 through the overlapped strip sections. The particular dimensions of length L, thickness t, and height or depth w, of the rectangular strip flexure 40 shown in FIG. 3 affect the compliance of the flexure 40 in response to applied forces and torques. As noted above with reference to FIG. 1, the flexure 40 is preferably designed to significantly resist deflections in the z direction (in response to an up-or-down applied force on the handle 10, for example) or to torques $\tau_x$, and $\tau_y$, about the x and y axes, respectively. The described rectangular strip flexure 40 can be used effectively for this purpose. The flexure 40 may also take on other shapes, with different dimensional properties than that illustrated in FIG. 3. For example, the flexure 40 may be of a circular, triangular, pentagonal, hexagonal or other geometric shape, or constructed of one single piece of material, rather than the four "L"-shaped flexure elements of FIG. 3. As will be apparent to those skilled in the art, springs or elastic materials may also be chosen to be suitably compliant to provide the desired compliance and displacement between the inner and outer members 20, 30.

The compliance and material properties of flexure 40 of FIG. 3 are described herein. The shape of the square flexure 40 can be used to determine its compliance matrix $\underline{C}$ assuming small deflections and simple stress distributions within the cross-section of the flexure element. The compliance matrix $\underline{A}$ for a single "L" shaped element of the flexure elements 70, 72, 74, 76 that make up the square-shaped flexure 40 of FIG. 3 is shown below in equation (1):

$$A = \begin{pmatrix} 2 & -\frac{3}{4} & 0 & 0 & 0 & -\frac{9}{4} \\ -\frac{3}{4} & \frac{1}{2} & 0 & 0 & 0 & \frac{3}{4} \\ 0 & 0 & p+\frac{3}{8}k & \frac{3}{4}p+\frac{3}{8}k & -\frac{3}{4}p & 0 \\ 0 & 0 & \frac{3}{4}p+\frac{3}{8}k & \frac{3}{2}p+\frac{3}{8}k & 0 & 0 \\ 0 & 0 & -\frac{3}{4}p & 0 & \frac{3}{2}p+\frac{3}{8}k & 0 \\ -\frac{9}{4} & \frac{3}{4} & 0 & 0 & 0 & 3 \end{pmatrix}$$

where p represents the aspect ratio and is equivalent to $$p = \frac{t^2}{w^2};$$

and k represents the ratio of the modulus of elasticity E and the modulus of rigidity G of the material, or $$k = \frac{E}{G}.$$

The displacement of $\Delta \overline{x}$ of a single "L" shaped element of the flexure elements 70, 72, 74, 76 in response to an applied force $\overline{f}$ is given by equation (2):

$$\Delta \overline{x} \equiv \begin{pmatrix} \Delta x \\ \Delta y \\ \Delta z \\ \Delta \theta_x \\ \Delta \theta_y \\ \Delta \theta_z \end{pmatrix} = \frac{L^3}{Et^3 w} A \begin{pmatrix} f_x \\ f_y \\ f_z \\ \tau_x \\ \tau_y \\ \tau_z \end{pmatrix} \equiv \frac{L^3}{Et^3 w} A \overline{f}$$

where $\Delta \overline{x}$ is the displacement vector (with translational as well as rotational displacements),
  L is the length of one side of the square material (the flexure 40),
  E is the modulus of elasticity,
  t is the thickness of the material,
  w is the height or depth of the material,
  h is height of the material, and
  $\overline{f}$ is the applied force vector.

These compliance matrices $\underline{A}$ are translated and rotated so that they are positioned as in FIG. 3. Then the compliance matrix, $\underline{C}$, is found by combining these four matrices by the following equation (3)

$$\underline{C} = \left( \sum_i A_i^{-1} \right)^{-1}$$

Performing the operations on the compliance matrices $\underline{A}$ results in the following expression for the compliance matrix $\underline{C}$ of the flexure 40 of FIG. 3:

$$\underline{C} = \begin{pmatrix} \frac{1}{20} & 0 & 0 & 0 & 0 & 0 \\ 0 & \frac{1}{20} & 0 & 0 & 0 & 0 \\ 0 & 0 & p\frac{k+p}{4(k+4p)} & 0 & 0 & 0 \\ 0 & 0 & 0 & p\frac{3(k+p)(k+4p)}{12k^3+80kp+40p^2} & 0 & 0 \\ 0 & 0 & 0 & 0 & p\frac{3(k+p)(k+4p)}{12k^3+80kp+40p^2} & 0 \\ 0 & 0 & 0 & 0 & 0 & \frac{3}{112} \end{pmatrix}$$

where, as before, p represents the aspect ratio and is equivalent to $$p = \frac{t^2}{w^2};$$

and k represents the ratio of the modulus of elasticity E and the modulus of rigidity G of the material, or $$k = \frac{E}{G}.$$

The displacement $\Delta \overline{x}$ of the flexure 40 of FIG. 3 in response to an applied force $\overline{f}$ is given by equation 5:

$$\Delta \bar{x} = \frac{L^3}{Et^3 w} C \bar{f}$$

Those of skill in the art will gain a number of insights from this compliance matrix $\underline{C}$. First, the matrix is diagonal, indicating that the $f_x$, $f_y$, and $f_z$ and torques $\tau_x$, $\tau_y$, and $\tau_z$ create only their corresponding motions and do not affect other motions. This is clear in view of the symmetry of the "L" shaped flexure elements 70, 72, 74, 76 that make up the square-shaped flexure 40 of FIG. 3. The matrix also shows how the choice of aspect ratio parameter p affects the design. If p is small, as in one embodiment, then the flexure 40 moves significantly only in response to the forces $f_x$, $f_y$, and $\tau_z$. If p is large, however, then the flexure 40 responds to $f_z$, $\tau_x$, and $\tau_y$. Overall, the compliance matrix shows how the dimensions of the flexure 40, length L, thickness t, and height or depth w, affect the response of the flexure 40.

As can be seen by those of skill in the art, the height or depth w and thickness t of the flexure 40 are determinative of the flexure's 40 relative response to forces along an axis and planar torques. In this embodiment, a typical value for the aspect ratio of the width or height w to the thickness t of the flexure 40 of FIG. 3 is approximately 30:1 in the preferred embodiment of the square flexure 40.

Preferably, the flexure 40 is capable of deflecting a desired distance $x_d$ when the full scale force F is applied in the x (or y) direction.

In addition, the flexure 40 must be resilient and not break or otherwise become permanently deformed or fatigued at this deflection. The deflection as a function of force F can be obtained form equation 6. It is:

$$x_d \equiv \Delta x = \frac{1}{20} \frac{FL^3}{Et^3 w}$$

where $F = f_x$ from equation (1). The maximum moment $M_{max}$ can be found via mechanics of materials type analysis as known in the art, and is related to the applied force F as shown in equation (7):

$$M_{max} = \frac{3}{40} FL$$

The moment of inertia I, of the flexure 40 when bent or twisted about the z-axis is:

$$I = \frac{1}{12} wt^3$$

Preferably, the maximum stress $\sigma_{max}$ should be a factor of safety less than the yield stress $\sigma_y$. The equation for the maximum stress $\sigma_{max}$ is then $$\sigma_{max} = \frac{M_{max} c}{I} = \frac{9}{20} \frac{FL}{wt^2} < \frac{\sigma_y}{F.S.}$$

where $c = t/2$ is the maximum distance form the normal axis of the flexure;

$\sigma_y$ is the yield stress; and

F.S. is the factor of safety desired. From equations (6) and (9), restrictions on the length L and the thickness t of the material can be found:

$$L < \frac{9}{\sqrt[3]{20}} \frac{(F.S.) x_d^{\frac{2}{3}} F^{\frac{1}{3}}}{w^{\frac{1}{3}}} \frac{E^{\frac{2}{3}}}{\sigma_Y}$$

$$t = \sqrt[3]{\frac{F}{20 x_d E w}} L$$

Preferably, the sensor is constructed to be as small as is possible. This implies minimizing the L dimensional component. A proper choice of material will minimize $E^{2/3}/\sigma_y$, or will maximize $$\frac{\sigma_y^{\frac{3}{2}}}{E},$$

the material factor of equation (10).

Certain materials score well by this criterion of maximizing $$\frac{\sigma_y^{\frac{3}{2}}}{E}.$$

One is high tensile strength steel, such as the "spring steel" in the preferred embodiment. Other materials that score highly are certain plastics and rubbers. The rubbers are less desirable material, as the thickness, t, is typically so large as to make the design unfeasible, but nylon or other plastics are possible alternatives. In the current embodiment, spring steel has good fatigue properties (when a factor of safety F.S. of 2 or greater is used) particularly when viewed relative to most plastics. Spring steel, however, may be difficult to machine and bend, as its hardness is similar to that of machine tools and it is rather brittle outside its elastic range.

Figure 4:
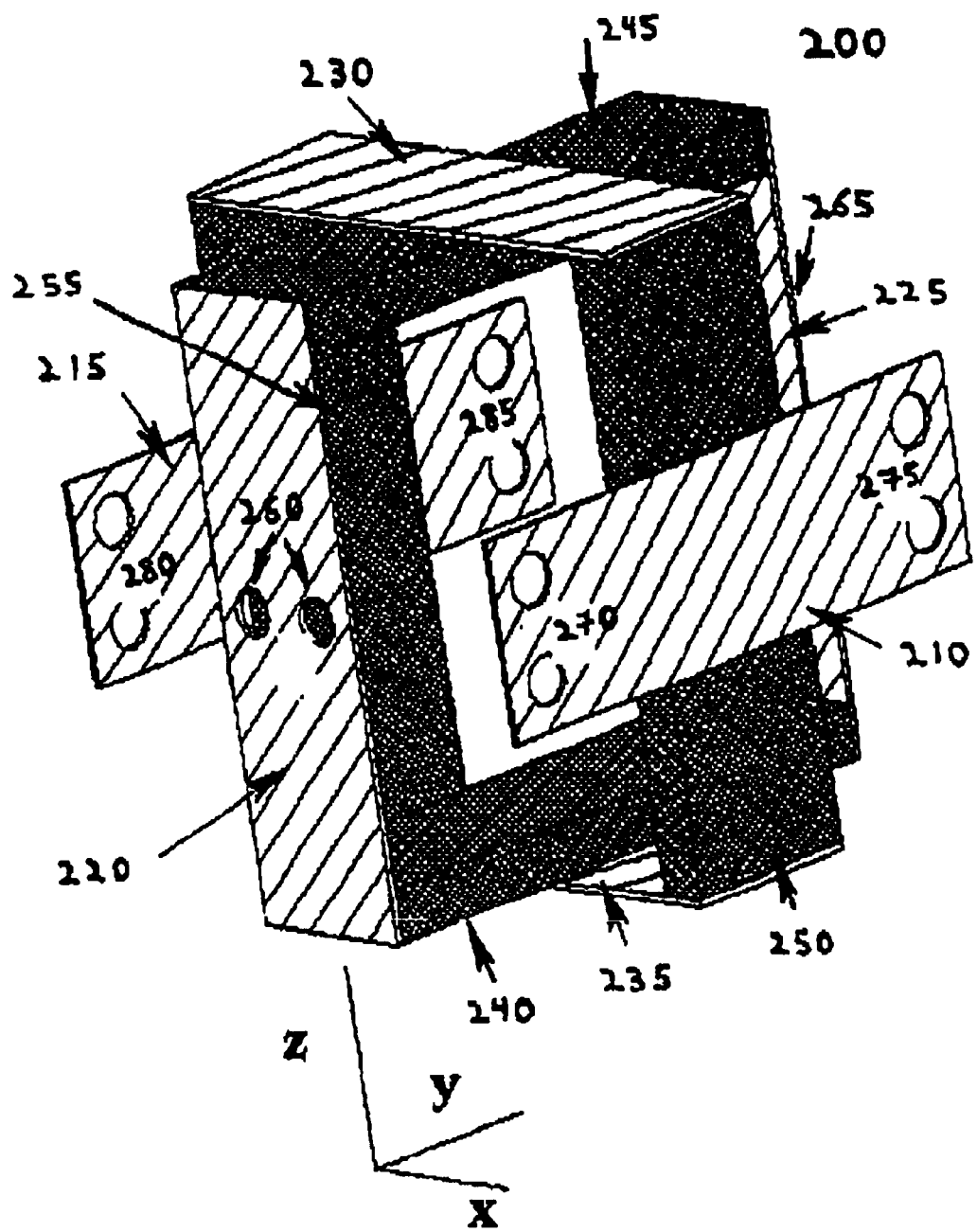
FIG. 4 is a simplified perspective view of another embodiment of a multi-axis force sensor providing a three-axis force sensor.

Shown in FIG. 4 is another embodiment of a flexure 200 capable of measuring forces along three axes to implement a three-dimensional force sensor. This particular embodiment of the flexure 200 is intended to direct applied forces along three independent component axes, while resisting large twists, rotational forces or torques about these axes. In this embodiment, three pairs of flexure strips 210, 215; 220, 225; and 230, 235 are positioned along each of the three axis to cooperatively allow displacement in the x, y, and z directions respectively. Rigid beam pairs 240, 245; and 250, 255 (represented by darker shading in FIG. 4) are connected at their ends and centers to the flexure beam pairs 210, 215; 220, 225; and 230; 235 as shown in FIG. 4. The rigid beam pairs 240, 245; and 250, 255 are preferably of rigid boxed section construction to resist bending or deflection. Of course, the rigid beam pairs may also take other forms such as an I-beam type construction to provide resistance to deflection and good strength to weight ratio. This resistance to deflection serves to eliminate rotational forces as noted above.

Each of the flexure strip pair 220, 225 has a pair of mounting points or attachment holes 260, and 265, respectively (pair 265, located on flexure strip 225, is hidden from view but is similarly positioned to pair 260, located on 220.) Each flexure strip of the flexure strip pair 210, 215 includes two pairs of attachment holes 270, 275; and 280, 285, respectively at the ends of each flexure. The attachment holes or positions can be utilized to position and mount the flexure to devices and mechanical assemblies from which applied forces are to be measured. For example, an embodiment of a three-dimensional force sensor using the flexure 200 may have an additional housing or base outer member (not shown in FIG. 4) that the flexure 200 can be attached to through mounting points 270, 275, 280, 285. A moveable inner member of handle (not shown) may be attached to mounting points 260, 265 to input forces to the flexure 200. As suggested by the configuration of the flexure 200, the handle or inner member may be a yoke or "Y" shaped member in order to connect to the flexure 200.

Preferably, each of the flexure strip pairs 210, 215; 220, 225; and 230, 235 allows motion and displacement in one coordinate axis direction. Each of the flexure strip pairs 210, 215; 220, 225; and 230, 235 respond to forces applied in the x, y, and z directions, respectively. For example, if a force having only an x direction component is applied, only the flexure strip pair 210, 215 will respond and bend to allow the flexure 200 to move in the x axis direction, without a corresponding movement of the other flexure strip pairs 220, 225; 230, 235. If an applied force is applied in the y direction, only the flexure strip pair 220, 225 responds to allow motion in the y axis direction. Similarly, if a force is applied in the z-axis direction, only flexure beam pair 230, 235 responds. In most instances, the applied force may have a directional component along each of the x, y, and z coordinate axes, causing each of the flexure strip pairs 210, 215; 220, 225; and 230, 235 to respond accordingly.

In one embodiment of the flexure 200 of FIG. 4, an applied force is determined from the displacement along each axis of the inner member relative to the outer member or the deflection of the flexure 200, via a readout mechanism along each of the three axes of the force sensor. The force measurements along each axis are independent of each other and the readout mechanism or technique outputs values unique to each axis.

Figure 5:
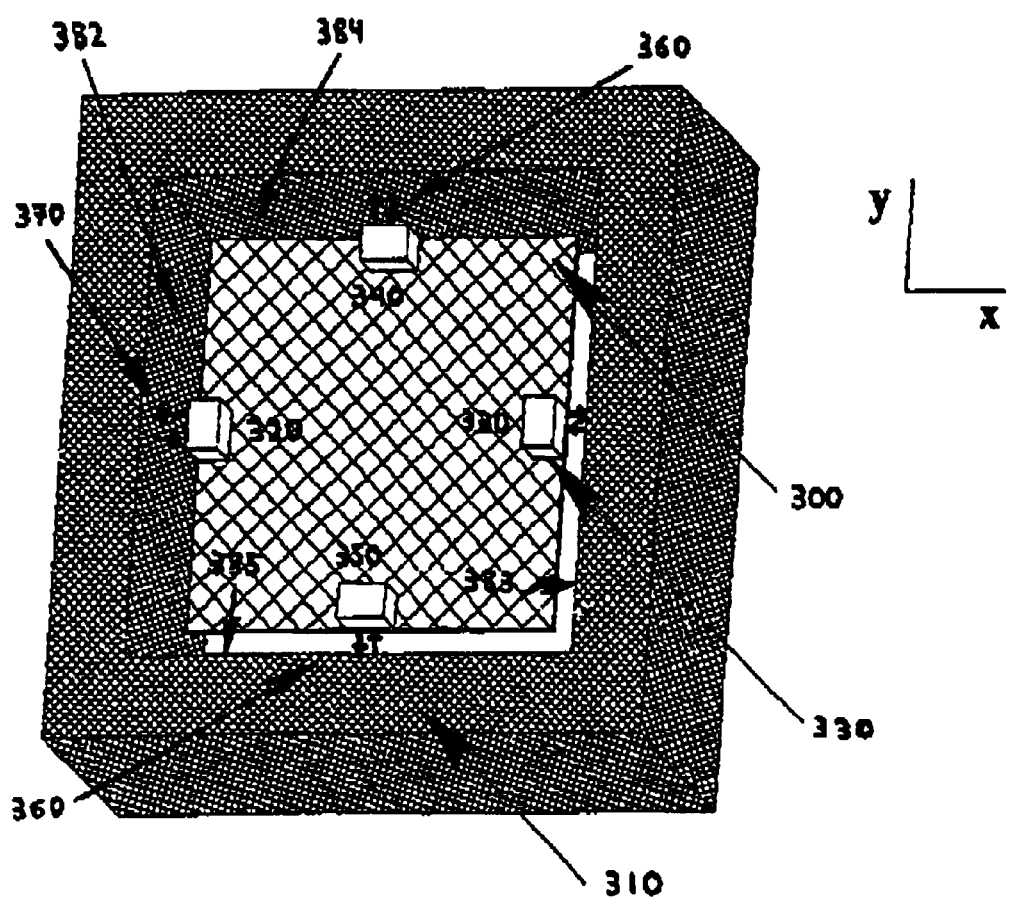
FIG. 5 is a simplified perspective view of an illustrative arrangement of sensors on a printed circuit board (PCB) that can be used in the force sensor of FIG. 1.

Shown in FIG. 5 is an embodiment using an optoelectronic readout mechanism to determine the forces that are applied to a force sensor such as the devices described herein. It should be understood that the readout mechanisms described herein may be applied to other types of mechanical flexures. The exemplary embodiment uses the reflective properties of light to provide non-contact reflective sensor that detects the displacement of the inner member 20 relative to the outer member 30. The displacement of the inner member 20 corresponds to a force applied to the handle 10.

FIG. 5 shows a simplified perspective view of one embodiment of the optical force sensor utilizing a printed circuit board (PCB) 300 positioned within an outer member 310, similar to the outer member 30 of FIG. 1. The outer member includes inward-facing surfaces 382, 383 (hidden from view), 384, and 385 (also hidden). The PCB 300 is preferably mounted on or attached to an inner member, which is not shown for purposes of clarity of explanation, but may be similar to the inner member 20 of FIG. 1. Preferably the PCB 300 is centered with respect to the outer member. The PCB 300 thus moves according to the inner member to which it is attached as the inner member moves with respect to the outer member 310. The flexure 40 is also not shown in FIG. 5 for purposes of clarity of explanation of the optical readout mechanism.

In this embodiment, two optical or "reflective object" sensors 320 and 330 are mounted opposite each other on two opposite edges of the PCB 300 to measure displacement of the inner member with respect to the outer member 310 along the x axis direction. Similarly, two optical sensors 340 and 350 are also mounted opposite each other on the other two opposite edges of the PCB 300 to measure the displacement of the inner member with respect to the outer member along the y axis direction. Optical reflective object sensor preferably consist of a light emitting source such as an infrared LED ("IRED") and phototransistor in a small shared package, both "looking" out the same end of the package. It should be understood that a light emitting source and optical sensor can also be separately provided and combined to form the optical sensor. In operation, the light emitting source emits a light of a constant, uniform amplitude. If there is a reflective surface or object nearby to bounce light back, the emitted light is reflected back to the phototransistor or photodiode that receives and detects the reflected light. The reflected light reaching the photo transistor causes a photocurrent that is proportional to the amplitude of light reaching the phototransistor. The closer the reflective surface is, the greater the generated photocurrent. The further the reflective surface, the less photocurrent is generated as is described further below.

Optical sensors 320, 330, 340 and 350 are positioned opposite to and directed toward inner surfaces 382, 383, 384, and 385, respectively, of the outer member 310. The arrows 360, 370 drawn at sensors 320, 330, 340, 350 are intended to represent the path traveled by light emitted by the object sensors 320, 330, 340, and 350 to the inner walls 382, 383, 384, and 385 of the outer member 310 and reflected back again to the sensors 320, 330, 340, 350.

When the inner member (not shown) similar to inner member 20 (FIG. 1) moves as directed by the handle and allowed by the flexure 40 (not shown) similar to that of FIG. 1, the PCB 300 attached to the inner member approaches an inner wall of the outer member 310. According the sensors 320, 330, 340, and 350, mounted on the PCB 300 will approach, moves farther away from, or along the inner walls 382, 383, 384, and 385, respectively, of the outer member 310, depending on the direction of the applied force. In one embodiment of the invention, the sensors 320, 330, 340, and 350 mounted on the PCB 300 are set-off a small distance from the edge of the PCB 300 to prevent the sensors from coming into physical contact with the inner walls 382, 383, 384, and 385 at the limit of the range its displacement. Alternatively, flexure 40 (not shown) such as described herein is dimensioned to prohibit the PCB 300 and consequently the sensors 320, 330, 340 and 350 mounted on the PCB 300 from contacting the inner walls 382, 383, 384, and 385, respectively, of the outer member 310.

For instance, a force applied only in the positive x direction causes optical sensor 320 mounted on PCB 300 to move away from inner wall 382, thus causing the optical sensor to detect the decreased proximity of the inner wall 382. Accordingly, optical sensor 330 mounted on the opposite side of PCB 300 will approach inner wall 383 and detect the increased proximity of the sensor 330 to the inner wall 383. Optical sensors 340, and 350 will not detect displacement from the inner walls 384, and 385 as a result of a displacement only in the y axis direction. As described above, using optical sensors, an increased proximity of an optical sensor to an inner wall results in greater amount of reflected light from the inner wall to be detected by the optical sensor. The difference in light intensity detected between optical sensors 320 and 330 provides an indication of the relative displacement of the handle or inner member (to which the PCB 300 is affixed) to the outer member 310 as allowed by a flexure. Accordingly, the force applied to the handle in the positive x direction can thus be determined. In one embodiment, the difference in light intensity measured by the object sensors is amplified to create an output voltage (in this case for the x axis) that is proportional to the applied force (again, along the x axis.)

In the case of a force applied only along the x axis direction, the reflective object sensors 340 and 350 positioned along the y axis will not move either toward or away from their respective inner walls 384 and 385, but only move in a direction parallel to the inner walls 384 and 385. In this way, the force sensing mechanisms along different axes are decoupled from each other, and force measurements along one axis can be made independent from forces along the other axis. Similarly, the reflective force sensors are not sensitive to and do not detect forces applied in the z-direction (upward or downward). For forces applied only in the z-direction, the sensors 320, 330, 340, 350 measuring forces in the x and y axes will remain at the same distance from their respective inner surface, 382, 383, 384, 385 and their measurements therefore will not be effected. The exemplary preferred embodiment shown in FIG. 5 performs in an analogous manner for applied forces in the negative x direction, or the positive and negative y directions.

The optical sensor used for sensors 320, 330, 340, and 350 in FIG. 5 can be a commercially marketed and available integrated circuit device such as the OPB706A reflective sensor manufactured by QT Optoelectronics of Sunnyvale, California. Such a device will usually consist of an infrared light-emitting diode (LED, IRED) and a phototransistor (rather than a photodiode) integrated in a single package. The IRED provides the infrared light that is transmitted and reflected from the inner surfaces, while the phototransistor detects the emitted light that is reflected.

Figure 6:
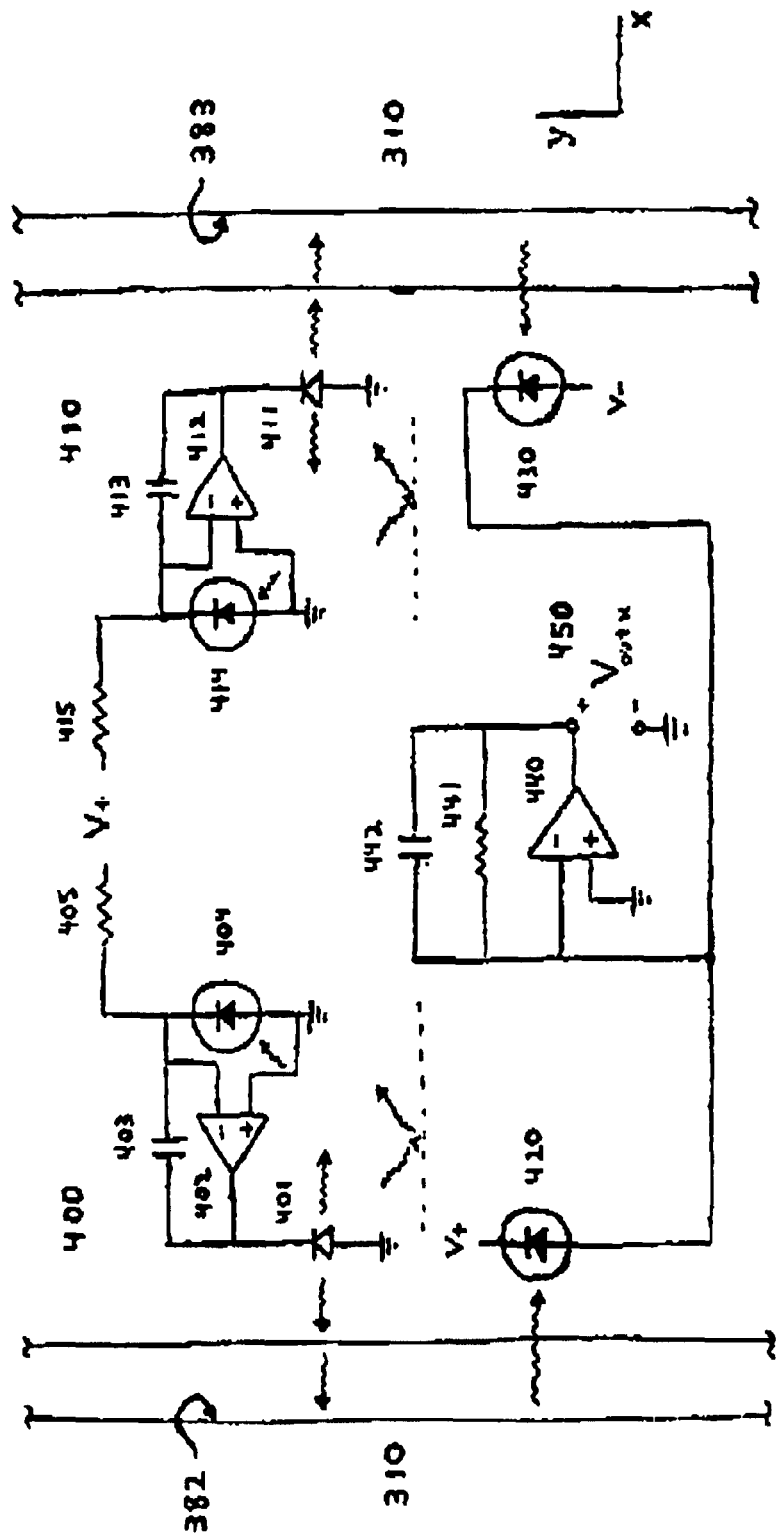
FIG. 6 is a diagram illustrating an optoelectronic sensor that can be utilized in the arrangement of sensors shown in FIG. 5.

Alternatively, FIG. 6 shows an exemplary embodiment of the optoelectronic two-axis force sensor using discrete components on the PCB 300 to implement the optical reflective object sensors used for sensors 320, 330, 340, and 350 in FIG. 5. In one embodiment, discrete components can be utilized to implement the optoelectronic circuitry implementing the simplified circuit diagram illustrated in FIG. 6 in order to provide an output signal voltage that is proportional to the applied force applied along a particular axis (here the x axis). Stabilizing circuits 400 and 410 provide stabilization of the current driven LEDs 401, 411 such that LEDs 401, 411 emit infrared light of substantially constant intensity. Infrared LEDs (IREDs) 401 and 411 are stabilized by optical feedback via respective operational amplifiers 402 and 412 (with capacitors 403 and 413) from respective photodiodes 404 and 414 and bias resistors 405 and 415. In this embodiment, photodiodes 404 and 414 preferably monitor the light amplitude emitted by their respective IREDs 401 and 411 and accordingly adjusts the current injected IREDs 401 and 411 to maintain consistent light output levels. In this manner, the current to the IRED (401 or 411) is kept substantially constant and the emitted light intensity is prevented from fluctuating substantially.

In this embodiment, symmetric configuration of sensors 320, 330, 340, and 350 are positioned on opposite sides of PCB 300 as shown in FIG. 5. It should be understood that in actual practice the configuration of sensors need not be symmetric as shown in these exemplary embodiments.

The emitted infrared light from IREDs 401 and 411 is incident on inner surfaces 382 and 383, respectively, and reflects back to be detected by photodiodes 420 and 430, respectively. When no forces are applied, the PCB 300 is preferably centered relative to the outer member 310, the photodiodes 420 and 430 are equally distant from their respective inner walls 382 and 383 and thus detect essentially the same amount of reflected light. The photocurrent through the photodiodes 420 and 430 is equivalent, and the voltage output by the operational amplifier 440 is effectively zero. As photodiode 420 moves away from its inner surface 382 and simultaneously photodiode 430 moves closer to its inner surface 383, the reflected light intensity detected by 420 will decrease while the reflected light intensity detected by 430 will increase, leading to an accompanying shift in the photocurrents and a corresponding change in the voltage output by the operational amplifier 440. Output circuitry 450 senses the difference in the photocurrents from photodiodes 420, 430 to output a voltage level proportional to the difference of the photocurrent that indicates the relative proximity of the photodiodes 420, 430 from the inner surfaces 382, 383.

In the illustrative embodiment, output circuitry 450 includes operational amplifier 440 with resistor 441 and capacitor 442 providing an output voltage $V_{out\ x}$. Resistor 441 and capacitor 442 provide parallel feedback of the output of the operational amplifier 440 back to the inverting terminal of the operational amplifier 440. Operational amplifier 440 thus amplifies the current difference of the photodiodes, thus providing an output voltage $V_{out\ x}$ that is approximately proportional to applied forces within the range allowed by the flexure 40.

Although FIG. 6 illustrates the optoelectronic circuitry for sensing forces along the x axis, measurement of forces applied along the y axis may be implemented in a similar manner. In that case, an output voltage $V_{out\ y}$ that is approximately proportional to applied forces within the range allowed by the flexure 40 is provided.

The optoelectronic element used for the photodiodes 404, 414, 420, and 430 in FIG. 5 can be commercially marketed and available photodiodes such as the PN334 pin photo diode manufactured by Panasonic of Japan. TheLN175 infrared LED, also manufactured by Panasonic, can be utilized as IREDs 401 and 411 of FIG. 5.

As can be seen by those skilled in the art, the optoelectronic reflective force sensor and readout circuitry and technique shown in FIG. 5 and FIG. 6 can be applied to the preferred embodiment for the flexure 200 for a three-axis or three-dimensional force sensor shown in FIG. 4. Of course, the techniques and devices described herein can be used by those skilled in the art in a variety of other arrangements and embodiments.

Referring now to FIG. 7, another embodiment employs an electromagnetic inductive readout technique to infer the applied force in the two-axis force sensor of FIG. 1 using the flexure 40 as described above. This embodiment uses induced voltages in a pattern of wires or traces to provide a non-contact inductive sensor that measures the displacement (controlled via the flexure 40) of the inner member 20 relative to the outer member 30. The measured displacement corresponds to the force applied to the handle 10.

FIG. 7 shows a simplified perspective view of three patterns of wires or traces 510, 520, 530, preferably fabricated on two separate but parallel positioned, non-contacting printed circuit board (PCBs) (not shown). In a one embodiment, two PCBs are mounted parallel to each other, one mounted on the base of an inner member (not shown) similar to inner member 20 of FIG. 1, and the other one mounted on an outer member (not shown) similar to outer member 30 of FIG. 1. The flexure 40 and the handle 10 are also not shown in FIG. 7 for purposes of clarity of explanation of the inductive sensor. One PCB is a transmitter PCB, containing a transmitter pattern of wires or traces 510 (lighter-shaded), while the other PCB contains two receiver patterns of wires and traces 520 and 530 (both darker-shaded), for measuring forces applied in the x and y directions, respectively. Either PCB can serve as the transmitter or the receiver.

The two PCBs do not make contact with each other and are parallel to and opposite from each other. The transmitter pattern of wires or traces 510 is thus opposite from and parallel to the two receiver patterns of wires or traces 520 and 530. That is, the two receiver patterns of wires or traces 520 and 530 lie in the same plane, while the transmitter pattern of wires or traces 510 lies in its own plane, parallel to receiver patterns 520 and 530. None of the patterns of wires or traces 510, 520 and 530 make electrical contact with each other.

An alternating current (AC) excitation signal is applied to the signal input 540 of the transmitter pattern of wires or traces 510. In a preferred embodiment, the signal frequency is 40 kHz, although the excitation signal is not limited to this frequency and can be any of a variety of frequencies. Excitation signal can be generated using circuitry such as described in U.S. application Ser. No. 09/246,826 and incorporated by reference herein can be used to provide an output voltage that is proportional to the applied force.

As in the case of the various embodiments of the optoelectronic force sensor, the measurements of the forces applied to the inductive force sensor are decoupled. The receiver pattern of wires or traces 520 outputs at the appropriate signal output 550 an output voltage $X_{out}$. This output voltage $X_{out}$ is then demodulated by a synchronous detector (not shown) yielding a direct current (DC) output signal that is proportional to forces applied along the x axis independent of force applied along the y axis. The other receiver pattern of wires or traces 530 outputs at the appropriate signal output 560 an output voltage $Y_{out}$. This output voltage $Y_{out}$ is then demodulated by another synchronous detector (not shown) yielding a direct current (DC) output signal that is proportional to forces applied along the y axis, while ignoring forces applied along the x axis. Synchronous detection circuitry such as described in U.S. application Ser. No. 09/246,826 and incorporated by reference herein can be used to provide an output voltage that is proportional to the applied force.

When no force is applied to the handle 10 (not shown), the patterns of wires or traces are situated relative to each other so that no voltage is ultimately output. This is the state of the inductive two-axis force sensor shown in FIG. 7. When the inner member 20 moves relative to the outer member 30, voltages are induced in the traces, and an output voltage is produced at the appropriate signal output that, after demodulation, is proportional to the applied force along an axis. In effect, the motion of one PCB with respect to the other PCB is monitored and measured. As can be seen from this embodiment the arrangement and loops of patterns of wires or traces 510, 520, 530 are advantageously arranged to interact along the x and y axis. As can be seen in the particular configuration of traces shown in FIG. 7, the traces are oriented perpendicular to each of the directions in which the applied force and resulting displacement are to be measured. It should be understood that many other arrangements of the patterns of wires or traces can be utilized to measure the force in the force sensor such circular, triangular, trapezoidal and even more arbitrary shapes, etc. Those of skill in the art can apply the teachings herein and devise the appropriate mechanisms suited to the particular geometry of the device.

Presented in Table 1 are experimental results for a two-axis force sensor employing optoelectronic reflection and force read-out techniques according to the exemplary embodiment. An exemplary embodiment of the optoelectronic two-axis force sensor as described above with reference to and illustrated in FIGS. 1, 2, 3, 5, and 6 may use a spring steel flexure similar to flexure 40 of FIG. 3. The following parameter values were used in accordance with the material selection analysis presented above in equations (6) through (11) for flexure 40 constructed of spring steel: a factor of safety=2, height or depth w=1.9 cm., full scale applied force F=66.3 lb., deflection in the y direction of F applied $y_d$=1 mm. These parameter values, in accordance with equation (10) imply a minimum value for the length L of the spring flexure 40 of $L_{min}$=4 cm.=1.6 in.

TABLE 1

Experimental Results For A Two-Axis Optoelectronic Force Sensor

| | |
|---|---|
| Maximum Deflection of the Force Sensor (In Either Direction) | 0.60 millimeters (mm) |
| Force Required to Achieve Maximum Deflection | 170 Newtons (N) |
| Sensitivity | 0.0018 Volts/N |
| Long Term Drift or Percentage of the Full Scale Force Subject to Drift in 24 Hours | 1.6 percent (%) |
| Short Term Drift or Percentage of the Full Scale Force Subject to Drift in 5 Minutes | 0.23 percent (%) |

The maximum deflection of the two-axis sensor was 0.60 mm (in either direction). This required a force of 170 N. This is very close to the force expected from the theory, which is 177 N. All drift terms above are in terms of peak to peak measurement.

The long-term drift shown in Table 1 is the amount the measured force varies in 24 hours for a constant applied force, whereas the short-term drift is the amount the measured force varies in five minutes, and is much less than the long-term drift. For applications involving humans interacting with the sensor, forces tend to be applied for short periods of time. In preferred embodiments, the application of forces for short periods of time can be utilized, via filtering the recorded force, to increase the resolution of the force sensor being used.

Applied forces (and torques) in the z, $\tau_x$, $\tau_y$ and directions caused no measurable change in the measured force. A torque of 0.5 Nm in the $\tau_z$ direction did cause a measured force (9.8 N) in the x-y plane of less than ten percent of the maximum force.

Figure 8:
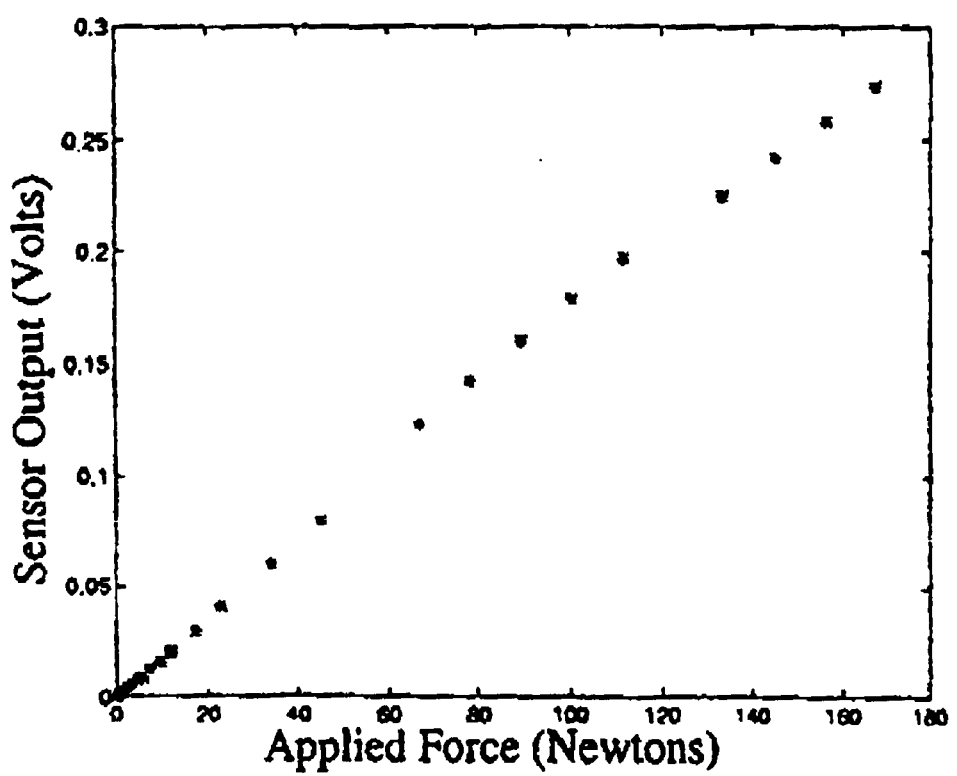
FIG. 8 is a z-y plot illustrating experimental results with respect to the applied force and the sensor output determined experimentally by use of a prototype two-axis optoelectronic force sensor.

FIG. 8 is a x-y plot illustrating preliminary experimental results with respect to the applied force and the sensor output in an exemplary embodiment of the two-axis optoelectronic force sensor. As those of skill in the art can observe by inspection of FIG. 8, the response (in terms of the sensor output voltage) of the force sensor to applied forces exhibits a linear relationship for relatively small forces. Larger forces on the order of the maximum force (~170 N) were not as linear. An applied force of 167 N, almost full scale, caused a measured force of 156 N.

A preferred embodiment of a single axis force sensor for measuring translational force along an x axis as shown in FIGS. 9–13 includes a member 900 that is movable in response to an applied force and a stationary member 902. The movable member 900 is a printed circuit board having a coil in the form of a conductive trace 904 that is formed in a zigzag pattern extending along the x axis. The stationary member 902 is a printed circuit board having a coil in the form of a conductive trace 906 that is formed in a zigzag pattern extending along the x axis where the zigzags of the trace 906 are interspersed with the zigzag of the trace 904 when the member 900 directly overlies the member 902 and no force is applied. The traces 904 and 906 are formed on respective surfaces of the members 900 and 902 that face each other. As shown in FIGS. 9 and 12, if the member 900 is above the member 902, the trace 904 is formed on a bottom surface of the member 900 and the trace 906 is formed on a top surface of the member 902.

A flexure 908, consisting of an elastomeric material, is disposed in the gap between the members 900 and 902, the flexure connecting the members 900 and 902. Preferably, the width of the gap between the first and second members is one half of the periodicity of the transmitting or receiving traces, for example 0.050 inches, although gaps of other sizes and periodicity can be used as well. The flexure 908 may include a single elastomeric element that fills the gap between a first and second members 900, 902 as shown in FIG. 26. Alternatively, the flexure may include a plurality of elastomeric elements that are present in only some of the areas of the gap between the first and second members as shown in FIG. 13. In a preferred embodiment, the elastomeric flexure is formed of polyurethane having a low durometer. However, other elastomers, such as high durometer polyurethane, rubber, silicone, etc. can be used for the flexure 908 as well. The elastomeric flexure has a low stiffness. However, other types of flexures can be used with the present invention as well including a plurality of springs, a plurality of beams, or a plurality of flexible strips, etc. Moreover, pegs or the like can be disposed in the gap between the first and second members, the pegs forming a mechanical limit or stops to prevent excessive relative movement between the first and second members.

An alternating current is applied to the trace 904 which is designated as a transmitting coil or trace. The current in the trace 904 induces a corresponding voltage and current in the trace 906, the trace 906 being designated as a receiving coil or trace. When a force to be measured is applied to the member 900 where the force has a horizontal or x axis component, the elastomeric flexure 908 shears and allows motion of the member 900 with respect to the member 902. As a consequence of this movement, the trace 904 is moved closer to the trace 906 causing the mutual inductance to deviate from zero. Depending on the sign of the displacement, the mutual inductance will be positive or negative with a magnitude that is proportional to the displacement of the member 900 with respect to the member 902. In a preferred embodiment, the forces applied, the stiffness of the elastomer 908, and the pitch of the zigzag traces 904 and 906 are such that in normal operation, the displacement of the member 900 is less than one half of the zigzag pitch so that the mutual inductance is first order proportional to the displacement. The change in the mutual inductance results in a change in the amplitude and phase of the signal induced in the receiving trace 906, the change in the signal being proportional to the relative motion between the members 900 and 902. It is noted, that the change in the induced signal may be linearly proportional or non-linearly proportional to the relative motion between the members 900 and 902. A synchronous detector is used to demodulate the signal induced in the receiving trace 906 to measure the relative displacement between the members 900 and 902 where the relative displacement represents the force applied to the member 900. In a preferred embodiment, an AC current at a frequency of 50 KHz and having a magnitude of 50 mA is conducted through the transmitting trace 904. The receiving trace 906 is connected to a synchronous detector of any known type having a voltage gain of 100,000. The voltage output of the synchronous detector represents the applied force.

FIGS. 14 and 15 illustrate a respective movable member 910 and stationary member 912 of a force sensor that measures force with respect to two orthogonal axes, the x and y axes which are in the planes of the members 910, 912. The movable member 910 includes a transmitting trace in an orthogonal pattern. Specifically, the transmitting trace includes a zigzag trace 914 extending along the y axis and a perpendicular zigzag trace 916 extending along the x axis. Similarly, the stationary member 912 has a receiving trace in an orthogonal pattern with a zigzag trace 918 extending along the y axis and a perpendicular zigzag trace 920 extending along the x axis. When the member 910 overlies the member 912, with the surfaces on which the traces 914, 916 and 918, 920 are formed facing each other, the zigzags of the trace 914 are interspersed with the zigzags of the trace 918 and the zigzags of the trace 916 are interspersed with the zigzags 920. The receiving trace 920 is formed with zigzag traces 922 and 924 connected in series and extending along the x axis so as to be responsive to x axis displacements of the member 910 with respect to the member 912. The receiving trace 918 includes traces 926 and 928 extending along the y axis so as to be responsive to y axis displacements of the member 910 with respect to the member 912. It is noted that the connection between the trace 926 and 928 is a crossover connection formed on the side of the printed circuit board member 912 opposite from the side on which the traces 926 and 928 are formed. The receiving trace 918 is connected to one synchronous detector whereas the receiving trace 920 is connected to a second synchronous detector. In a preferred embodiment, the two detectors operate at the same frequency which is preferably the same frequency at which the transmitting traces 914 and 916 are driven.

It is noted that in the embodiments of FIGS. 9–15, the transmitting coil or traces are formed on the movable members and the receiving coil or traces are formed on the stationary member. In an alternative embodiment, the transmitting coils or traces may be formed on the stationary member and the receiving coils or traces may be formed on the movable member. Moreover, although the embodiments described with respect to FIGS. 9–15 use stationary member 902 and 915 it should be apparent that the members 902 and 915 may be movable as well as the members 900 and 914 where the sensor measures relative displacement between the members 900 and 902, 914 and 915.

In a further embodiment of the present invention, as shown in FIGS. 16–20, the transmitting and receiving coils are formed on the same member where the other member is formed as a shading plate with an elastomeric flexure, not shown, disposed between the member on which the transmitting and receiving coils are formed and the shading plate member. In a preferred embodiment, the transmitting and receiving coils are formed on the stationary member and the shading plate member is movable. However, it should be apparent to one of ordinary skill in the art, that the transmitting and receiving coils can be formed on a movable member wherein the shading plate member is either stationary or movable. The pattern for the transmitting coil or trace 933 is depicted in FIG. 17 whereas the pattern for the receiving coil or trace is depicted in FIG. 18. In the force sensor of this embodiment, the transmitting trace 933 and the receiving trace 934 are formed on the same surface of the same printed circuit board member 931 and interspersed such as depicted in FIG. 16. Although the traces 933 and 934 are printed on the same side of the printed circuit board 931, crossover connections are formed on the opposite side of the printed circuit board 931 as needed. The nominal mutual inductance of the transmitting trace 933 and receiving trace 934 is zero when no force is applied due to the symmetry of the patterns forming the traces. A lead 932 is used to apply an AC current to the transmitting trace 933 and leads 935 are used to connect the receiving trace 934 to a synchronous detector.

Figure 20:
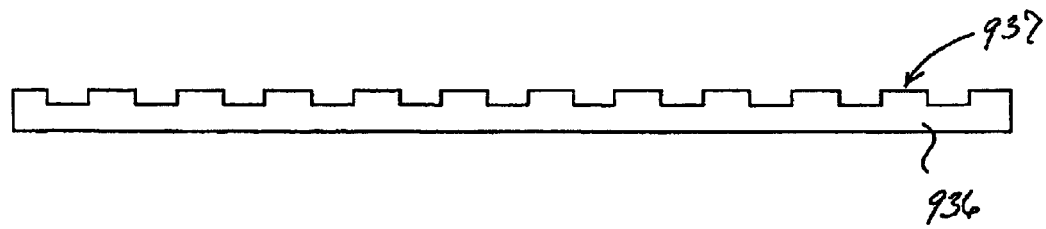
FIG. 20 is a side view of an alternative shading plate pattern for the force sensor illustrated in FIG. 16.

The shading plate used in this embodiment is depicted in FIG. 19. The shading plate 936 consists of a pattern of conductive material 937 with a periodicity or pitch matching that of the transmitting traces 933. The conductive material 937 of the shading plate affects the mutual inductance of the transmitting trace 933 and the receiving trace 934 according to the extent of the displacement of the shading plate member 936 with respect to the member 931 supporting the transmitting and receiving traces. Preferably, the pattern of conductive material 937 of the shading plate 936 is formed of a non-ferromagnetic metal such as copper. The conductive pattern of the shading plate 936 may be formed using conventional printed circuit board fabrication techniques. It should be noted that other conductive materials may be used to form the pattern of the shading plate including aluminum, ferromagnetic materials such as iron or nickel as well as ferromagnetic non-conductors such as ferrite ceramics. The pattern may consist of an alternation of metal bands in which the metal is present in one band and absent in the adjacent band as illustrated in FIG. 19. Alternatively, as shown in FIG. 20, the shading plate pattern may consist of grooves in a thicker shading plate so that the conductive surface is closer or farther from the printed circuit board 931 with the required periodicity. The shading plate may consist of a ferromagnetic material screened with a patterned layer of non-ferromagnetic conductive material or vice a versa. Variations in the construction of the shading plate 936 may be advantageous for different applications as will be apparent to one of ordinary skill in the art.

Figure 21:
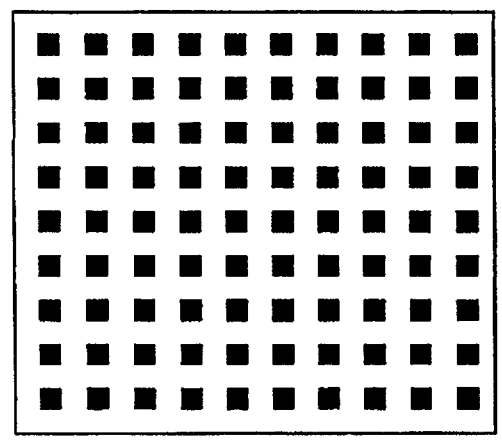
FIG. 21 illustrates a shading plate pattern that may be utilized with a printed circuit board member having transmitting traces as shown in FIG. 14 and receiving traces as shown in FIG. 15 formed on the same printed circuit board member.

A two axes force sensor of the shading plate type can be formed with the transmitting and receiving trace patterns of FIGS. 14 and 15 formed on a single printed circuit board member with the traces superimposed in distinct layers of the printed circuit board or separated laterally in the same layer of the printed circuit board member. In this two axes force sensor, a suitable shading plate pattern is depicted in FIG. 21. With the shading plate embodiments of the present invention, relative displacement of the shading plate member with respect to the other member having the transmitting and receiving coils affects the mutual inductance between the transmitting trace and the receiving trace so that the signal induced in the receiving trace can be demodulated by a synchronous detector to measure relative displacement and the applied force.

A force sensor of the shading plate type for measuring torque is depicted in FIGS. 22 and 23; whereas, a force sensor of the moving coil type for measuring torque is shown in FIGS. 24 and 25. For the latter type of force sensor, a movable printed circuit board 940 has a transmitting coil 942 formed by a circular zigzag trace pattern. A stationary printed circuit board member 944 has a receiving coil 946 with the same circular zigzag trace pattern as the transmitting coil 942. When the member 940 overlies the member 944 with the trace patterns 942 and 946 facing each other and an elastomeric flexure coupled between the members 940 and 944, a force sensor for measuring torque is formed. When the member 940 is twisted with respect to the member 944, a signal is induced in the receiving trace 946, the signal being proportional to the extent and direction of the applied torque. As in other embodiments described herein, the receiving coil 946 is coupled to a synchronous detector for demodulating the induced signal. For a force sensor of the shading plate type shown in FIGS. 22 and 23, the transmitting and receiving trace patterns 942 and 946 are formed on the same printed circuit board member 948. The other member 950 is formed as a shading plate with a shading plate pattern having the same periodicity as the traces 942 and 946. As discussed above, an elastomeric flexure or other type of flexure connects the member 948 to the shading plate member 950 and a synchronous detector is coupled to the receiving coil to demodulate the induced signal so as to provide a measure of the applied torque. It is noted that in the shading plate type of force sensor, the traces 942 and 946 may be formed on the same layer of the printed circuit board 948 with crossovers on another layer or, the traces 942 and 946 may be on separate layers of the printed circuit board 948. It should be appreciated that the periodicity of the traces may be different from that shown in the figures. Moreover, for measuring torque, the traces need not form a complete circle and the traces need not be circular or radial.

FIGS. 26–29 illustrate a force sensor for measuring torque about the both x and y axes. As shown in FIG. 26, the force sensor includes a shading plate member 952 that is coupled by an elastomeric flexure 908 to another member 958 on which is formed both the transmitting and receiving trace coils. More particularly, the printed circuit board member 958 includes a transmitting trace 956 and receiving traces 954 and 955 for measuring torque about the y axis and x axis respectively. In a preferred embodiment, the traces 954, 955 and 956 are formed on separate layers of the printed circuit board member 958. The mutual inductance of the transmitting trace 956 and the receiving trace 955 is nominally zero due to the counter-rotation of the trace loops 957 and 958 forming parts of the trace 955. When the shading plate 952 is in its nominal, undeflected position, the mutual inductance of the traces 956 and 955 is zero. When a torque about the x axis is applied to the shading plate 952, an angular deflection of the shading plate 952 with respect to the printed circuit board member 958 occurs. The mutual inductance of the traces 956 and 955 departs from zero as a result of the applied torque wherein the sign and magnitude of the signal induced in the receiving coil 955 represents the angular deflection of the shading plate 952 and thus the applied torque. The loops 959 and 960 forming parts of the receiving coil 954 are similarly counter-rotated to measure torque about the y axis. In this embodiment, the shading plate 952 need not be patterned. Preferably, the shading plate 952 is a flat plate of highly conductive metal such as aluminum or copper.

Figure 30:
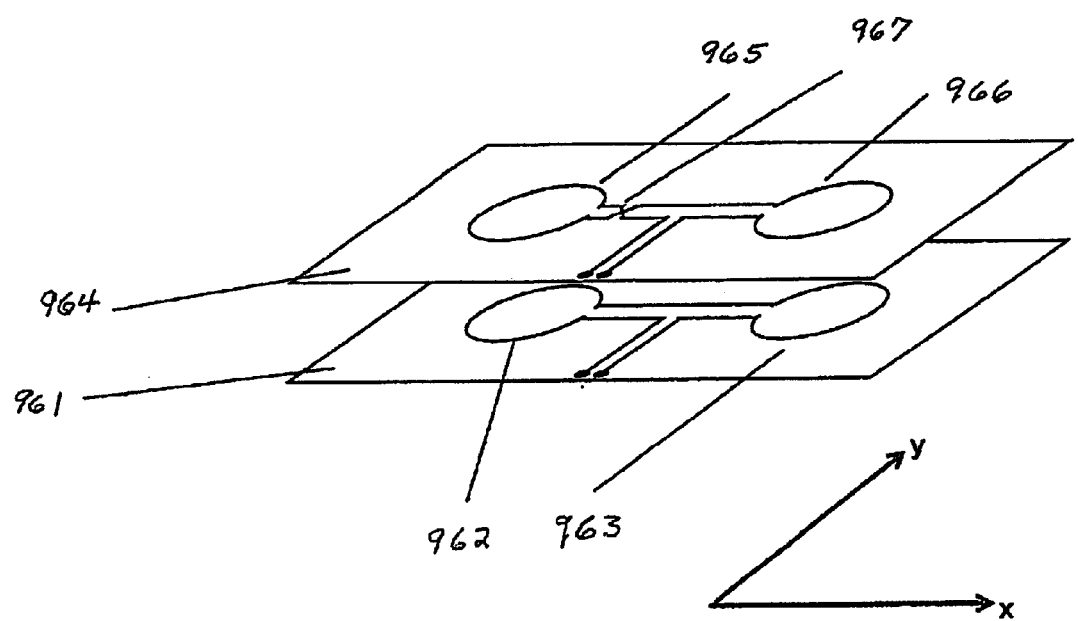
FIG. 30 illustrates a perspective view of a force sensor wherein a first member carries a transmitting trace consisting of a pair of loops and a second member that supports a receiving trace consisting of a pair of loops.

FIG. 30 illustrates a moving coil type of force sensor for measuring torque about both the x and y axes. A movable printed circuit board member 964 includes a transmitting trace formed of a first loop 965 and a second loop 966 wherein the loops are counter-rotated due to the crossing 967. The second printed circuit board member 961 includes a receiving trace formed of a first loop 962 and a second loop 963. Because the current in the loop 965 is in the opposite direction of the current in the loop 966 due to the crossing 967, the mutual inductance of the transmitting trace of the member 964 with the receiving trace of the member 961 is nominally zero when no torque is applied. As in other embodiments, an elastomeric flexure, not shown, couples the member 964 to the member 961. When a torque is applied to the member 964 about the y axis, the distance and thus the magnetic coupling between the loops 962 and 965 changes. Similarly, the magnetic coupling between the loops 963 and 966 is changed in an opposite manner. As such, the mutual inductance of the transmitting trace with the receiving trace departs from zero wherein the magnitude of the signal induced in the receiving coil is proportional to the deflection of the member 964 with respect to the member 961 and thus proportional to the applied torque. It is noted, that the loops forming the transmitter and receiver traces may include multiple turns. Moreover, the loop traces need not be circular.

Figure 31:
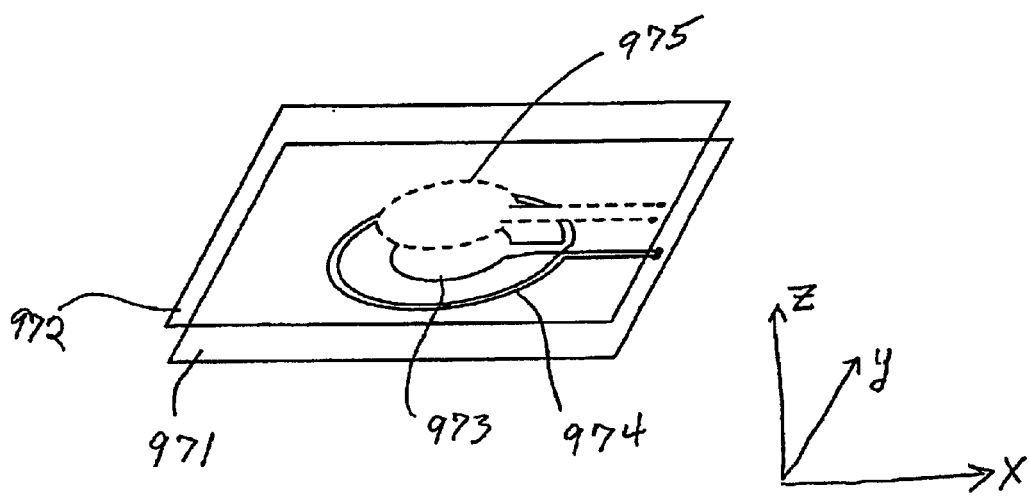
FIG. 31 is a z-axis force sensor with a first member having a transmitting coil formed of a loop trace and a second member having a receiving coil with a pair of loop traces.

FIG. 31 illustrates a further embodiment of a force sensor in accordance with the present invention for measuring force along the z axis which is perpendicular to the planes of the first member 971 and second member 972. A transmitting trace 975 is formed on a surface of the member 972 facing the member 971. The member 971 includes a receiving trace formed of a loop 973 and a loop 974. The printed circuit board member 972 is coupled to the printed circuit board member 971 by a flexure element which, is preferably an elastomeric flexure as discussed above. When the distance between the printed circuit board member 972 and the printed circuit board 971 is at a nominal distance of, for example, 0.050 inches, corresponding to a relaxed position of the flexure, the mutual inductance between the transmitting and receiving traces is nominally zero. When a force is applied to the member 972 along the z-axis, causing the distance between the transmitting and receiving traces to change, the mutual inductance changes such that a signal is induced in the receiving coil wherein the magnitude and sign of the induced signal is proportional to the deviation of the distance between the members 971 and 972 from its nominal value. It is noted that in a preferred embodiment, the loops 973 and 974 of the receiving trace are counter-rotated wherein the individual mutual inductance between the loop 973 and the loop 975 and the mutual inductance between the loop 974 and the loop 975 are equal and opposite to one another when the flexure coupling the member 971 and 972 is undeflected. It should be appreciated that it is not necessary that the mutual inductance be nominally zero at zero deflection although it is advantageous. Further, it is not necessary to include both loops 973 and 974. In the present embodiment, the two loops 973 and 974 are used to create a nominal zero mutual inductance when the member 971 is at a given distance from the member 972.

Figure 32:
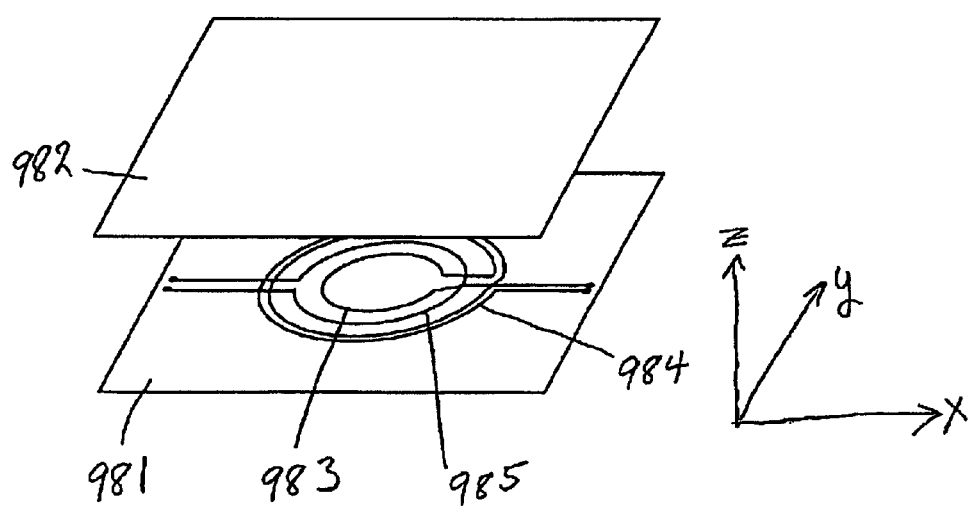
FIG. 32 is another embodiment of a z-axis force sensor having a first member formed as a shading plate and a second member including a transmitting loop trace and a receiving trace consisting of a pair of loops.

FIG. 32 illustrates a shading plate type of force sensor for measuring force in the z-axis, perpendicular to the planes of the shading plate 982 and printed circuit board member 981. In this embodiment, the shading plate member 982 is preferably a conductive non-ferromagnetic metal such as aluminum. The printed circuit board member 981 carries a receiving trace consisting of loops 983 and 984. The printed circuit board member 981 also includes the transmitting trace 985. The shading plate 982 is compliantly connected to the printed circuit board member 981 by an elastomeric flexure. When the distance between the shading plate member 982 and the printed circuit board member 981 is at a nominal distance, for example 0.050 inches, again corresponding to a relaxed position of the flexure, the mutual inductance between the transmitting and receiving traces is nominally zero. A force applied to the shading plate member 982 along the z-axis causes a deviation of the mutual inductance from zero such that the signal induced in the receiving coil has a magnitude and sign that is proportional to the deviation of the distance between the members 982 and 981 from its nominal value. In a preferred embodiment, the loops 983 and 984 of the receiving trace are counter-rotating loops whose individual mutual inductance to the transmitting trace loop 985 are equal and opposite to one another when the flexure coupling the members 981 and 982 is undeflected.

Many modifications and variations to the embodiments described above can be made without departing from the present invention. For example, various combinations of traces for different axes can be combined in a single force sensor as desired. Moreover, various combinations of traces for measuring force with respect to different axes can be combined onto a single printed circuit board member. Alternatively, a number of single or multiple axis sensors can be stacked so that the axes sensed are divided between a number of sensors. For example, a two axis x-y force sensor can be stacked with a two axis x-y torque sensor. Further, although the frequency of operation is preferably 50 KHz and the excitation current is 50 mA, both the frequency of operation and excitation current may be varied without affecting the principles of the present invention. For example, in certain circumstances, it may be desirable to use two or more distinct frequencies of operation that may be imposed upon separate transmitting coils or combined on the same transmitting coil. Further, for multi-axis sensors, it is not necessary for the transmitting traces to be in series. The transmitting traces may be in parallel or they may be excited separately. Moreover, while the embodiments depicted in FIGS. 9–32 are planer and therefore well suited to fabrication using conventional printed circuit techniques and methods, it should be understood that other patterning techniques may be used such as the techniques utilized to fabricate flexible printed circuits. Moreover, the overall shape of the force sensor may be changed. For example, the sensors may be wrapped into a cylinder shape, a spherical shape, etc. Many other modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A force sensor comprising:
    a stationary member;
    a member movable by an applied force;
    a transmitting coil supported on either the stationary member or the movable member;
    a receiving coil supported on either the stationary member or the movable member;
    a flexure coupled between the stationary member and the movable member; and
    a signal applied to the transmitting coil, the signal in the transmitting coil inducing a signal in the receiving coil wherein motion of the movable member results in a detectable change in the signal induced in the receiving coil to provide a measure of the force applied to the movable member.

2. A force sensor as recited in claim 1 wherein the change in the signal in the receiving coil is proportional to the motion of the movable member relative to the stationary member.

3. A force sensor as recited in claim 2 wherein the change in the signal is non-linearly proportional to the motion of the movable member.

4. A force sensor as recited in claim 2 wherein the change in the signal is linearly proportional to the motion of the movable member.

5. A force sensor as recited in claim 1 wherein the transmitting coil and the receiving coil are supported on different ones of the stationary member and movable member.

6. A force sensor as recited in claim 1 wherein the transmitting coil is supported on the movable member and the receiving coil is supported on the stationary member.

7. A force sensor as recited in claim 1 wherein the transmitting coil is supported on the stationary member and the receiving coil is supported on the movable member.

8. A force sensor as recited in claim 1 wherein the transmitting and receiving coils are supported on the same member.

9. A force sensor as recited in claim 1 wherein the transmitting and receiving coils are supported on one member and the other member includes a shading plate.

10. A force sensor as recited in claim 1 wherein the transmitting and receiving coils are printed circuit traces.

11. A force sensor as recited in claim 10 wherein the traces are in a first zigzag pattern for measuring translation along an axis.

12. A force sensor as recited in claim 11 including traces in a second zigzag pattern orthogonal to the first pattern for measuring translation along two orthogonal axes.

13. A force sensor as recited in claim 10 wherein the traces form a first loop pair with one loop and another counter-rotated loop for measuring tilt about a first axis.

14. A force sensor as recited in claim 13 including a second loop pair of traces orthogonal to the first loop pair, the second loop pair having one loop and another counter-rotated loop for measuring tilt about a second axis orthogonal to the first axis.

15. A force sensor as recited in claim 10 wherein the traces are in a circular zigzag pattern for measuring rotation.

16. A force sensor as recited in claim 10 wherein the traces are a loop pair for measuring distance between the stationary and movable members.

17. A force sensor as recited in claim 16 including a third coil formed as a loop trace to null the mutual inductance when the movable member is a predetermined distance from the stationary member.

18. A force sensor as recited in claim 1 wherein the transmitting and receiving coils are printed circuit traces on one member and the other member includes a shading plate.

19. A force sensor as recited in claim 18 wherein the traces are in a zigzag pattern and the shading plate is patterned with the same periodicity as the traces, for measuring translation along a first axis.

20. A force sensor as recited in claim 19 including a second set of traces and shading plate orthogonal to but with the same pattern as used for the traces and shading plate measuring translation along the first axis, the second set measuring translation along a second axis orthogonal to the first axis.

21. A force sensor as recited in claim 18 wherein the traces form a first loop pair with one loop and another loop counter rotated, measuring tilt about a first axis.

22. A force sensor as recited in claim 21 including a second loop pair of traces-orthogonal to the first loop pair, the second loop pair having one loop and another counter-rotated loop measuring tilt about a second axis orthogonal to the first axis.

23. A force sensor as recited in claim 18 wherein the traces are in a circular zigzag pattern and the shading plate is patterned with the same periodicity measuring rotation.

24. A force sensor as recited in claim 18 wherein the traces are a loop pair measuring distance between the stationary and movable members.

25. A force sensor as recited in claim 24 including a third coil formed as a loop trace to null the mutual inductance when the movable member is a predetermined distance from the stationary member.

26. A force sensor as recited in claim 1 wherein the flexure is an elastomeric flexure.

27. A force sensor as recited in claim 1 wherein the flexure includes a plurality of springs.

28. A force sensor as recited in claim 1 wherein the flexure includes a plurality of beams.

29. A force sensor as recited in claim 1 wherein the flexure includes a plurality of flexible strips.

30. A force sensor comprising:
a first member;
a second member, at least one of the first and second members being movable with respect to the other member by a force applied thereto;
a first coil supported on either the first or second member;
a second coil supported on either the first or second member;
a flexure coupled between the first and second members; and
an AC signal applied to the first coil inducing in the second coil, a signal with an amplitude and phase representing the applied force.

31. A force sensor comprising claim 30 including a synchronous detector for demodulating the induced signal to measure relative displacement of the first and second members.

32. A force sensor as recited in claim 30 wherein the first coil and the second coil are supported on different ones of the first member and second member.

33. A force sensor as recited in claim 30 wherein the first coil is supported on the first member which is movable and the second coil is supported on the second member which is stationary.

34. A force sensor as recited in claim 30 wherein the first coil is supported on the second member which is stationary and the second coil is supported on the first member which is movable.

35. A force sensor as recited in claim 30 wherein the first and second coils are supported on the same member.

36. A force sensor as recited in claim 30 wherein the first and second coils are supported on the same member and the other member includes a shading plate.

37. A force sensor as recited in claim 30 wherein the first and second coils are printed circuit traces.

38. A force sensor as recited in claim 37 wherein the traces are in a first zigzag pattern for measuring translation along an axis.

39. A force sensor as recited in claim 38 including traces in a second zigzag pattern orthogonal to the first pattern for measuring translation along two orthogonal axes.

40. A force sensor as recited in claim 37 wherein the traces form a first loop pair with one loop and another counter-rotated loop for measuring tilt about a first axis.

41. A force sensor as recited in claim 40 including a second loop pair of traces orthogonal to the first loop pair, the second loop pair having one loop and another counter-rotated loop for measuring tilt about a second axis orthogonal to the first axis.

42. A force sensor as recited in claim 37 wherein the traces are in a circular zigzag pattern for measuring rotation.

43. A force sensor as recited in claim 37 wherein the traces are a loop pair for measuring distance between the stationary and movable members.

44. A force sensor as recited in claim 43 including a third coil formed as a loop trace to null the mutual inductance when the movable member is a predetermined distance from the stationary member.

45. A force sensor as recited in claim 30 wherein the first and second coils are printed circuit traces on one member and the other member includes a shading place.

46. A force sensor as recited in claim 45 wherein the traces are in a zigzag pattern and the shading plate is patterned having the same periodicity as the traces, measuring translation along a first axis.

47. A force sensor as recited in claim 46 including a second set of traces and shading plate orthogonal to but with the same pattern as used for the traces and shading plate measuring translation along the first axis, the second set measuring translation along a second axis orthogonal to the first axis.

48. A force sensor as recited in claim 45 wherein the traces form a first loop pair with one loop and another loop counter rotated for measuring tilt about a first axis.

49. A force sensor as recited in claim 48 including a second loop pair of traces orthogonal to the first loop pair, the second loop pair having one loop and another counter-rotated loop for measuring tilt about a second axis orthogonal to the first axis.

50. A force sensor as recited in claim 45 wherein the traces are in a zigzag pattern and the shading plate is patterned with the same periodicity as the traces for measuring translation along a first axis.

51. A force sensor as recited in claim 45 wherein the traces are a loop pair for measuring distance between the first and second members.

52. A force sensor as recited in claim 45 including a third coil formed as a loop trace to null the mutual inductance when the first member is a predetermined distance from the second member.

53. A force sensor as recited in claim 30 wherein the flexure is an elastomeric flexure.

54. A force sensor as recited in claim 30 wherein the flexure includes a plurality of springs.

55. A force sensor as recited in claim 30 wherein the flexure includes a plurality of beams.

56. A force sensor as recited in claim 30 wherein the flexure includes a plurality of flexible strips.

57. A force sensor comprising:

a first member;

a second member, at least one of the first and second members being movable with respect to the other member by a force applied thereto;

a first circuit trace formed on either the first or second member;

a second circuit trace formed on either the first or second member;

an elastomeric flexure coupled between the first and second members; and a signal applied to the first trace inducing a signal in the second trace representing the applied force.

58. A force sensor comprising claim 57 including a synchronous detector for demodulating the induced signal to measure relative displacement of the first and second members.

59. A force sensor as recited in claim 57 wherein movement of one member with respect to the other member produces a proportional change in amplitude and phase of the induced signal.

60. A force sensor as recited in claim 59 wherein the change in the induced signal is linearly proportional to the movement.

61. A force sensor as recited in claim 59 wherein the change in the induced signal is non-linearly proportional to the movement.

* * * * *

UNITED STATES PATENT AND TRADEMARK OFFICE
CERTIFICATE OF CORRECTION

PATENT NO. : 7,047,826 B2 Page 1 of 1
APPLICATION NO. : 10/896348
DATED : May 23, 2006
INVENTOR(S) : Michael A. Peshkin It is certified that error appears in the above-identified patent and that said Letters Patent is hereby corrected as shown below:

IN THE SPECIFICATION:

Column 1, line 49, delete "is";

Column 2, line 24, delete "support" and insert -- supported --;

Column 3, line 37, delete "show" and insert -- shows --;

Column 3, line 60, delete "and" at the end of the description of Fig. 8;

Column 6, line 10, insert "30" after -- member --;

Column 6, line 57, delete "was" and insert --ways --; insert "as" before -- pairs --;

Column 10, line 25, in the equation, add a line under the letter "A";

Column 11, line 30, "In addition ...." should not be a new paragraph;

Column 14, line 28, delete "According" and insert -- Accordingly --; and

Column 16, line 52, delete the word "a".

Signed and Sealed this

Ninth Day of January, 2007

JON W. DUDAS
*Director of the United States Patent and Trademark Office*